(12) United States Patent
Mewada

(10) Patent No.: US 12,511,749 B1
(45) Date of Patent: Dec. 30, 2025

(54) SYSTEM AND METHOD FOR HISTOPATHOLOGICAL IMAGE-BASED CANCER CLASSIFICATION USING AN EXTENDED DEEP-LEARNING NETWORK

(71) Applicant: PRINCE MOHAMMAD BIN FAHD UNIVERSITY, Dhahran (SA)

(72) Inventor: Hirenkumar Kantilal Mewada, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/284,243

(22) Filed: Jul. 29, 2025

Related U.S. Application Data

(60) Provisional application No. 63/792,709, filed on Apr. 22, 2025.

(51) Int. Cl.
*G06T 7/00* (2017.01)
*A61B 10/00* (2006.01)
(Continued)

(52) U.S. Cl.
CPC ........ *G06T 7/0012* (2013.01); *A61B 10/0041* (2013.01); *G06V 10/42* (2022.01); *G06V 10/44* (2022.01); *G06V 10/764* (2022.01); *G06V 10/82* (2022.01); *G06V 20/695* (2022.01); *G06V 20/698* (2022.01); *G16H 30/40* (2018.01); *G06T 2207/10056* (2013.01);
(Continued)

(58) Field of Classification Search
None
See application file for complete search history.

(56) References Cited

U.S. PATENT DOCUMENTS

2023/0306598 A1\* 9/2023 Wainrib ................ G16H 30/20
2024/0366168 A1 11/2024 Deasy et al.

FOREIGN PATENT DOCUMENTS

CN 117975041 B 6/2024
KR 10-2025-0006557 1/2025

OTHER PUBLICATIONS

Se Woon Cho, et al., "Deep learning-based multi-stage segmentation method using ultrasound images for breast cancer diagnosis", Journal of King Saud University—Computer and Information Sciences vol. 34, Issue 10, Part B, Nov. 2022, pp. 10273-10292.

\* cited by examiner

*Primary Examiner* — Christopher Braniff
(74) *Attorney, Agent, or Firm* — Oblon, McClelland, Maier & Neustadt, L.L.P.

(57) ABSTRACT

A method and a system of diagnostic assistance. The method includes obtaining a plurality of histopathological images of tissue samples. The method includes receiving, by a processing circuitry configured with a pretrained dense convolutional neural network, a histopathological image of the plurality of histopathological images and extracting global features of the histopathological image. The global features are spatial features of the histopathological image. The method includes extracting, by the processing circuitry, local features of the histopathological image. The local features are spectral features. The method includes concatenating, by a concatenation operator, the global features with the local features to obtain concatenated features. The method includes outputting, by a classification layer, a classification of the histopathological image based on the concatenated features.

20 Claims, 16 Drawing Sheets

(51) Int. Cl.
  *G06V 10/42*   (2022.01)
  *G06V 10/44*   (2022.01)
  *G06V 10/764*  (2022.01)
  *G06V 10/82*   (2022.01)
  *G06V 20/69*   (2022.01)
  *G16H 30/40*   (2018.01)

(52) U.S. Cl.
  CPC ............... *G06T 2207/20081* (2013.01); *G06T 2207/20084* (2013.01); *G06T 2207/30024* (2013.01); *G06T 2207/30068* (2013.01); *G06V 2201/03* (2022.01)

SYSTEM AND METHOD FOR HISTOPATHOLOGICAL IMAGE-BASED CANCER CLASSIFICATION USING AN EXTENDED DEEP-LEARNING NETWORK

CROSS-REFERENCE TO RELATED APPLICATIONS

This application claims the benefit of priority to provisional application No. 63/792,709 filed Apr. 22, 2025, the entire contents of which are incorporated herein by reference.

STATEMENT REGARDING PRIOR DISCLOSURE BY THE INVENTORS

Aspects of this technology are described in an article Mewada, Hiren. 2024. "Extended Deep-Learning Network for Histopathological Image-Based Multiclass Breast Cancer Classification Using Residual Features" *Symmetry* 16, no. 5:507. The article is herein incorporated by reference in its entirety.

BACKGROUND

Technical Field

The present disclosure is directed to image analysis and, more particularly, to a method and a system for histopathological image-based cancer classification using an extended deep-learning network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Histopathology involves microscopic examination of tissue samples to identify and diagnose diseases, particularly various forms of cancer. Histopathological images obtained from stained tissue samples reveal complex cellular structures and textured regions that are critical for accurate disease classification. These textured regions often carry vital diagnostic information, especially in distinguishing between benign and malignant tissues, or among various cancer subtypes.

Recent advancements in a field of Artificial Intelligence (AI), particularly deep learning, have introduced convolutional neural networks as powerful tools for automated image classification in medical imaging. The convolutional neural networks are capable of extracting global spatial features that represent high-level structural patterns within images. However, traditional convolutional neural networks primarily focus on global convolutional features, which may be insufficient for capturing the fine-grained, repetitive, and locally varying patterns that are characteristic of histopathological textures.

This is because, in traditional convolutional neural networks, the feature extraction process typically relies on a combination of pretrained convolutional layers and trainable convolutional layers that are optimized for spatial representation. While effective in many natural image classification tasks, these traditional convolutional neural networks tend to underperform in texture-rich domains, such as histopathology, where local spectral features play a crucial role. The lack of mechanisms to effectively capture and integrate localized pattern variations leads to suboptimal classification accuracy, particularly in scenarios requiring fine discrimination between visually similar tissue types. Therefore, there exists a need for an improved system and method that enables more accurate classification of histopathological images.

Accordingly, it is one object of the present disclosure to provide a method and a system for histopathological image-based cancer classification using an extended deep-learning network. An object is a method that integrates both local and global information. The fusion of local and global information facilitates both the intricate details of specific areas and an overarching context. An object is a learnable residual method to extract local features, which are then combined with spatial features and residual features for image-based classification.

SUMMARY

In an exemplary embodiment, a portable diagnostic assistance system is disclosed. The portable diagnostic assistance system includes a mobile device having a memory storing a plurality of histopathological images of tissue samples obtained using a microscope. The portable diagnostic assistance system includes a processing circuitry configured with a pretrained dense convolutional neural network that receives as input a histopathological image of the plurality of histopathological images and extracts global features of the histopathological image. The global features are spatial features of the histopathological image. The pretrained dense convolutional neural network includes a plurality of convolutional layers. The processing circuitry is further configured with a plurality of trainable residual layers connected to an output of a final layer of the plurality of convolutional layers, each of the plurality of trainable residual layers including a skip connection configured with a 1×1 kernel (K) and a sigmoid activation function to extract local features of the histopathological image. The local features are spectral features. The processing circuitry is further configured with a concatenation operator that concatenates the global features with the local features to obtain concatenated features. The processing circuitry is further configured with a classification layer connected to an output of the concatenation operator and configured to output a classification of the histopathological image.

In another exemplary embodiment, a method of diagnostic assistance is disclosed. The method includes obtaining a plurality of histopathological images of tissue samples. The method includes receiving, by a processing circuitry configured with a pretrained dense convolutional neural network, a histopathological image of the plurality of histopathological images and extracting global features of the histopathological image. The global features are spatial features of the histopathological image. The pretrained dense convolutional neural network includes a plurality of convolutional layers. The method includes extracting, by the processing circuitry, local features of the histopathological image, by a plurality of trainable residual layers connected to an output of a final layer of the plurality of convolutional layers, each of the plurality of residual layers including a skip connection configured with a 1×1 kernel (K) and a sigmoid activation function. The local features are spectral features. The method includes concatenating, by a concatenation operator, the global features with the local features to obtain concatenated features. The method includes outputting, by a classification layer, a classification of the histopathological image.

In another exemplary embodiment, a non-transitory computer-readable medium having instructions stored therein that, when executed by one or more processors, cause the one or more processors to perform a method of diagnostic assistance. The method includes obtaining a plurality of histopathological images of tissue samples. The method includes receiving, by a processing circuitry configured with a pretrained dense convolutional neural network, a histopathological image of the plurality of histopathological images and extracting global features of the histopathological image. The global features are spatial features of the histopathological image. The pretrained dense convolutional neural network includes a plurality of convolutional layers. The method includes extracting, by the processing circuitry, local features of the histopathological image, by a plurality of trainable residual layers connected to an output of a final layer of the plurality of convolutional layers, each of the plurality of residual layers including a skip connection configured with a 1×1 kernel (K) and a sigmoid activation function. The local features are spectral features. The method includes concatenating, by a concatenation operator, the global features with the local features to obtain concatenated features. The method includes outputting, by a classification layer, a classification of the histopathological image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
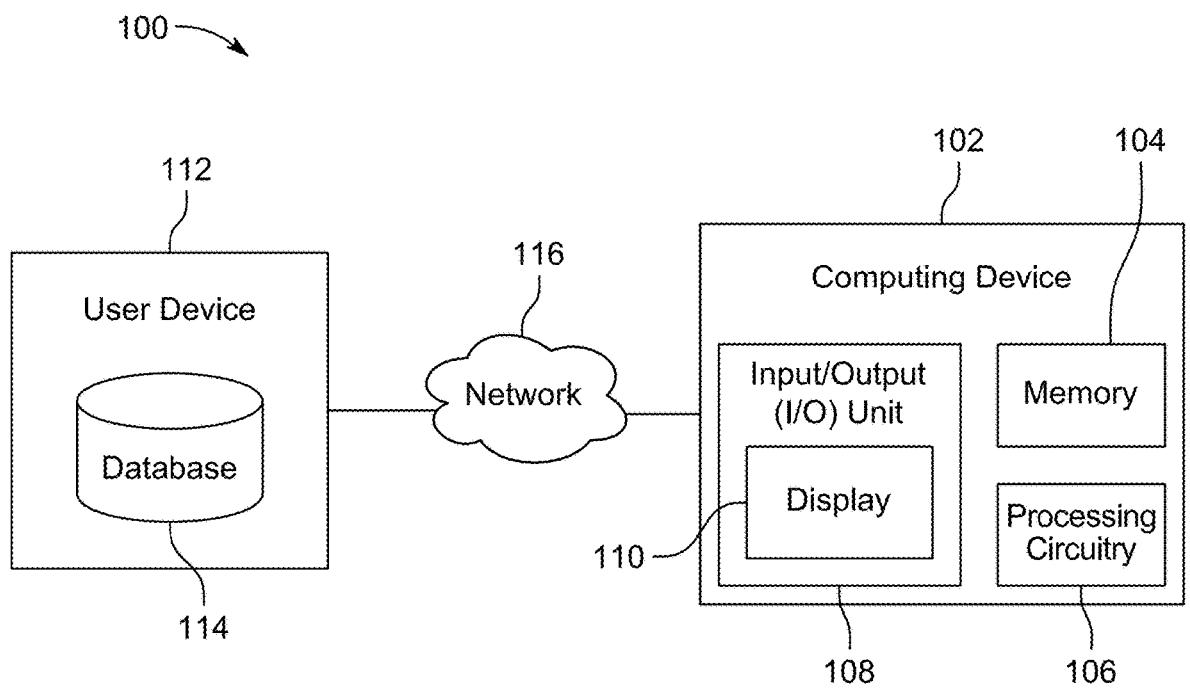
FIG. 1 is an exemplary diagram of a portable diagnostic assistance system for providing diagnostic assistance, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method of diagnostic assistance. In order to perform the diagnostic assistance, the method includes obtaining histopathological images of tissue samples. Upon obtaining the histopathological images, a histopathological image is received by a pretrained dense convolutional neural network which extracts global features of the histopathological image. The global features are spatial features of the histopathological image. In addition, the pretrained dense convolutional neural network includes several convolutional layers. Once the global features are extracted, local features of the histopathological image are extracted using trainable residual layers connected to an output of a final layer of the convolutional layers. Each of the residual layers includes a skip connection configured with a 1×1 kernel (K) and a sigmoid activation function. The local features are spectral features. Upon extracting the global features and the local features, the global features are concatenated with the local features using a concatenation operator to obtain concatenated features. Once the concatenated features are obtained, a classification of the histopathological image is outputted by a classification layer.

Referring now to FIG. 1, the present disclosure provides an exemplary diagram of a portable diagnostic assistance system 100 for providing diagnostic assistance, according to certain embodiments. The portable diagnostic assistance system 100 is configured to provide diagnostic assistance by analyzing previously obtained histopathological images of one or more tissue samples. Further, based on the analysis, the portable diagnostic assistance system 100 is configured to process each histopathological image using an extended deep-learning network and determine a cancer type (if any) based on the processing of each histopathological image. The extended deep-learning network is an integration of a pretrained dense convolutional neural network with the trainable residual layers. The portable diagnostic assistance system 100 aids medical professionals in making accurate and timely diagnostic decisions for a patient based on an identified cancer type. In particular, to provide the diagnostic assistance, the portable diagnostic assistance system 100 includes a computing device 102. The computing device 102 is configured to analyze and process each histopathological image using the extended deep-learning network. Examples of the computing device 102 can include a laptop, a desktop, a tablet, a smartphone, and other portable computing device.

Initially, the computing device 102 is configured to obtain the histopathological images of each of the one or more tissue samples. A histopathological image is a microscopic image of a tissue sample used to analyze and diagnose diseases, particularly cancer. The histopathological image is crucial for users (e.g., medical professionals) to identify abnormal cell structures, tissue architecture, and other disease-related features. In an embodiment, the histopathological images are received from a user device 112. The user device 112 can be a mobile device. The mobile device can include a database 114. The database 114 is configured to store the histopathological images of the one or more tissue samples associated with one or more patients. In an embodiment, the database 114 of the user device 112 correspond to a memory of the user device 112.

The histopathological images are captured using a microscope. The microscope is an optical instrument that uses a lens to magnify small objects, such as tissue samples, whose images can be captured using a camera device or a camera inbuilt within the user device 112. In some embodiments, the microscope is a camera-mounted microscope or a whole-slide scanner. The camera-mounted microscope is an optical microscope integrated with a digital camera that is configured to capture images of a tissue specimen to obtain the histopathological images. Furthermore, the whole-slide scanner is a digital imaging device that is configured to capture images of the tissue specimen in high-resolution to obtain the histopathological images.

Further, each of the camera devices, the camera-mounted microscope, and the whole-slide scanner is configured to transmit the histopathological images via an associated communication circuitry. For example, the user device 112 may receive the histopathological images via a network 116. Examples of the user device 112 may include, but are not limited to, a smartphone, a laptop, a tablet, a phablet, a personal digital assistant (PDA), or a portable diagnostic terminal equipped with imaging and communication capabilities. Once the histopathological images are obtained and stored in the database 114 (also referred to as the memory) associated with the user device 112, the user device 112 is configured to send the histopathological images to the computing device 102 for further processing. The computing device 102 is configured to process the histopathological images to determine a classification (i.e., the cancer type) for each of the histopathological images.

To process the histopathological images, the computing device 102 can include a memory 104. The memory 104 can be configured to store the pretrained dense convolution neural network. The pretrained dense convolutional neural network includes a number of convolutional layers. Additionally, the memory 104 can be configured to store one or more computer-readable instructions or routines that, when executed, cause the computing device 102 to provide diagnostic assistance. The memory 104 can be configured to work in conjunction with a processing circuitry 106. In other words, the processing circuitry 106 is configured to execute the pretrained dense convolutional neural network within the memory 104 to perform processing of the histopathological images. The processing circuitry 106 is implemented as one or more microprocessors, microcomputers, microcontrollers, Digital Signal Processors (DSPs), Central Processing Units (CPUs), logic circuitries, and/or any devices that process data based on operational instructions. Further, the memory 104 is a volatile memory, such as a Random-Access Memory (RAM), or a non-volatile memory such as a Read Only Memory (ROM), an Erasable Programmable Read Only Memory (EPROM), a flash memory, and the like.

In particular, initially, the processing circuitry 106 is configured with the pretrained dense convolutional neural network to receive a histopathological image as input. Upon receiving the histopathological image, the pretrained dense convolutional neural network is configured to extract one or more global features of the histopathological image. The global features are spatial features of the histopathological image. In an embodiment, in the histopathological image, the spatial features include distribution, shape, orientation, and spatial organization of cells, tissues, and other microscopic structures, which are critical for understanding the overall architecture of a tissue sample.

Once the global features are extracted, one or more local features of the histopathological image are extracted. The local features are extracted by the trainable residual layers associated with the processing circuitry 106. The trainable residual layers are connected to an output of a final layer of the convolutional layers of the pretrained dense convolutional neural network. In an embodiment, the trainable residual layers reside within the memory 104 of the computing device 102. In an embodiment, to extract the local features of the histopathological image, each of the residual layers includes a skip connection and a sigmoid activation function. The skip connection is configured with a 1×1 kernel (K). The 1×1 K in the skip connection generates learned features from the global features at each pixel location in the histopathological image. In an embodiment, the learned features refer to patterns, representations, or abstractions automatically generated using the 1×1 K in the skip connection. Further, the sigmoid activation function determines a difference between the learned features and the global features outputted from the pretrained dense convolutional neural network. In an embodiment, the local features are spectral features of the histopathological image. The spectral features refer to the fine-grained, localized variations in intensity, color, or texture within small regions of the histopathological image. These spectral features capture subtle patterns and frequency-based details that are crucial for distinguishing similar tissue structures at a cellular level.

Further, the processing circuitry 106 is configured with a concatenation operator that is stored within the memory 104 of the computing device 102. The processing circuitry 106, in conjunction with the concatenation operator, is configured to concatenate the global features with the local features to obtain concatenated features. The concatenated features, for example, include a combination of an average cell size (e.g., a global feature) and a pixel-level texture gradient (e.g., a local feature), a combination of a tissue shape descriptor (e.g., a global feature) and a nucleus color variance (e.g., a local feature). Once the concatenated features are obtained, the processing circuitry 106, in conjunction with a classification layer, is configured to output the classification of the histopathological image. The classification layer is connected to an output of the concatenation operator stored within the memory 104 of the computing device 102.

In an embodiment, the classification of the histopathological image is a binary classification, i.e., benign tissue or malignant tissue. Upon determining the classification to be the malignant tissue of the histopathological image, the classification layer is configured to generate an output for a multiclass classification for the histopathological image classified as the malignant tissue. The multiclass classification of malignant tissue may include, but is not limited to, ductal carcinoma (DC), lobular carcinoma (LC), mucinous carcinoma (MC), papillary carcinoma (PC).

In an embodiment, the computing device 102 includes an Input/Output (I/O) unit 108. The I/O unit 108 is used by the user (e.g., the medical professional) to provide inputs (such as the histopathological images, provided as a training dataset, testing dataset, or validation dataset) to the computing device 102. Further, the I/O unit 108 can include a display 110. The display 110 is used to display intermediatory results, e.g., the global features, the local features, the concatenated features, etc., or a final result, e.g., the output of the classification of the histopathological image based on processing performed by the computing device 102 for providing diagnostic assistance.

Figure 2:
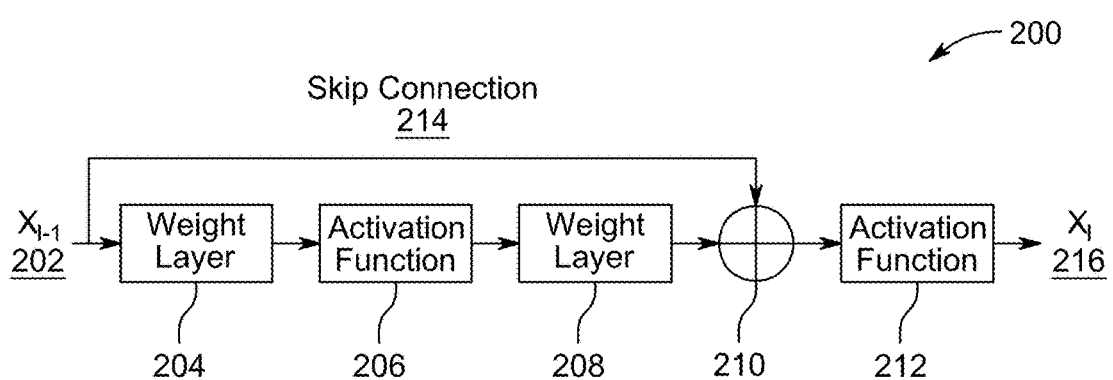
FIG. 2 is an exemplary diagram depicting a traditional formation of a residual layer in a convolutional neural network, according to certain embodiments.

Referring now to FIG. 2, the present disclosure provides an exemplary diagram 200 depicting a conventional residual layer in a convolutional neural network. In an embodiment, the convolution neural network is, for example, a pretrained DenseNet161. In the conventional residual layer, initially, an input '$x_{l-1}$' 202 is provided to a weight layer 204 (e.g., a convolutional layer). The input '$x_{l-1}$' 202 can correspond to the global features of the histopathological image. Upon receiving the input '$x_{l-1}$' 202, the weight layer 204 is configured to generate a set of learned features from the input '$x_{l-1}$' 202, i.e., the global features. Once the learned features are generated using the weight layer 204, an activation function 206 is applied to allow the residual layer to introduce non-linearity. The results obtained using the activation function 206 are further provided as input to a weight layer 208 (e.g., another convolutional layer). The weight layer 208 is configured to apply additional convolutional transformations to further refine nonlinear features. The results of these transformations representing residual mapping are combined with the input '$x_{l-1}$' 202 received directly via a skip connection 214 using an element-wise addition operator 210. The combined features are further processed using an activation function 212 to generate an output, '$x_l$' 216. In an embodiment, the activation function 206 and the activation function 212 are a Rectified Linear Unit (ReLu) activation function. The ReLu activation function is applied to introduce non-linearity and to suppress negative feature values. The output, '$x_l$' 216 of the residual layer, thus integrates both refined features and original features of the histopathological image.

The DenseNet architecture is a convolutional neural network that combines features by concatenating them. Hence, the l'th layer has l inputs, consisting of the feature-maps of all preceding convolutional blocks. Its own feature-maps are passed on to all L−l subsequent layers. This introduces L(L+1)/2 connections in an L-layer network, instead of just L, as in traditional architectures, hence the name dense convolutional network (DenseNet).

The DenseNet architecture explicitly differentiates between information that is added to the network and information that is preserved. DenseNet layers are very narrow, adding only a small set of feature-maps to the collective knowledge of the network and keep the remaining feature maps unchanged, and the final classifier makes a decision based on all feature-maps in the network. In the present disclosure, DenseNet161 is pretrained.

In a preferred embodiment, both local features and global features are incorporated for improved performance. To achieve this, an architecture of the pretrained dense convolutional neural network is modified by introducing the trainable residual layers after the final convolutional layer to create the extended deep-learning network. Further, the global features obtained from a final convolution layer (also referred to as the final layer) of the convolutional layers are used as an input for computing the local features (also referred to as residual features).

Each residual layer of the trainable residual layers includes the skip connection configured with a convolutional kernel (K) of size 1×1 and a stride of 1, followed by the sigmoid activation function. The 1×1 K generates the learned features from the global features at each pixel location in the histopathological image. Further, the sigmoid activation function is used to determine the difference between the learned features and the global features output from the pretrained dense convolutional neural network. In an embodiment, the local features are computed using equation 1.

$$\mathcal{R}_{L,tj} = X_{L-1,tj} - \sigma(K * X_{L-1,tf}) \tag{1}$$

In equation 1, '$\mathcal{R}_{L,tj}$' represents the local features at layer 'L' and at position 'tj'. '$X_{L-1,tj}$' represents the global features obtained at the final convolution layer (i.e., 'L−1') at the position 'tj'. '$X_{L-1,tf}$' represents the global features obtained at the final convolution layer (i.e., 'L−1') at the position 'tf'. 'σ' represents the sigmoid activation function. 'K' represents the 1×1 kernel (K).

Figure 3:
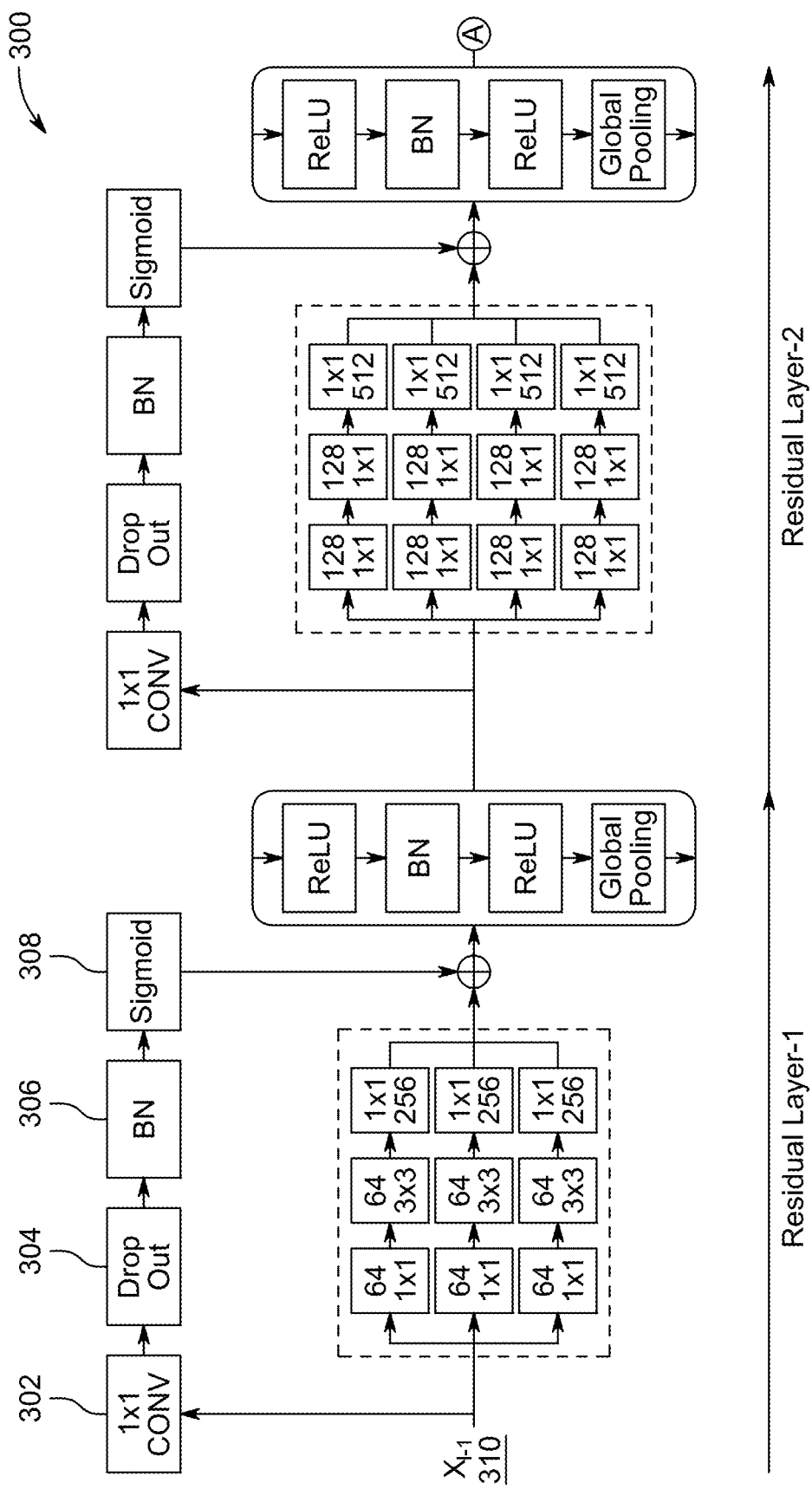
FIG. 3 is an exemplary diagram depicting a learnable residual layer-based deep convolutional neural network, according to certain embodiments.
Figure 3:
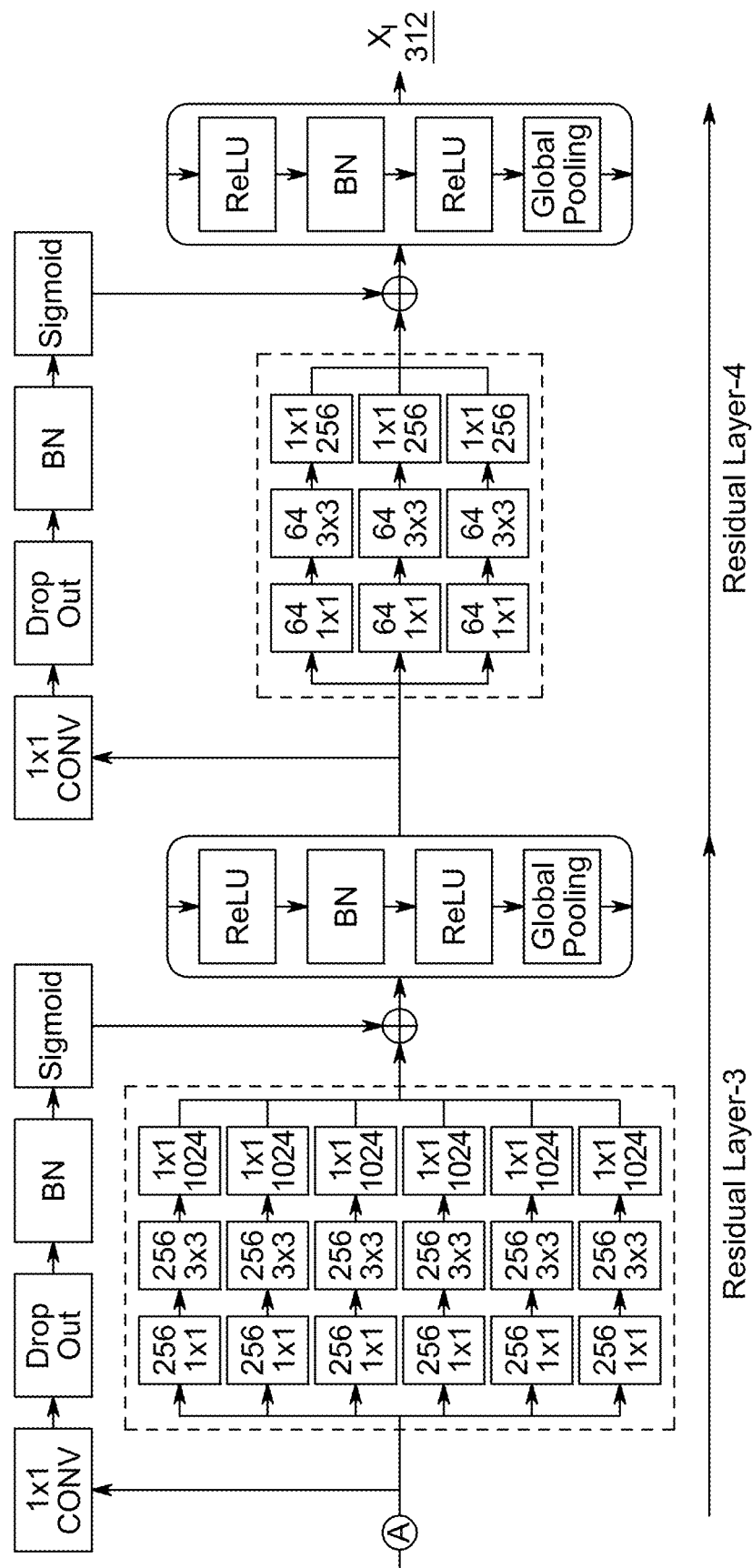

Referring now to FIG. 3, the present disclosure provides an exemplary diagram 300 depicting a learnable residual layer as an extension to a deep convolutional neural network, according to certain embodiments. The learnable residual layer for the deep convolutional neural network can correspond to the trainable residual layers after the final layer convolution layer. The learnable residual layer may also be referred to as the extension to the deep-learning network. As depicted in FIG. 3, the trainable residual layers, for example, include a residual layer 1, a residual layer 2, a residual layer 3, and a residual layer 4. In an embodiment, a set of four residual layers (i.e., the residual layer 1, the residual layer 2, the residual layer 3, and the residual layer 4) is shown just for ease of explanation. However, any number of trainable residual layers may be integrated depending on the complexity of classification. As depicted in FIG. 3, each residual layer includes a set of parallel convolution paths for a pre-defined number of channels. For example, the residual layer 1 includes a 1×1 convolution path, a 3×3 convolution path, and a 1×1 convolution path for 256 channels. Further, each residual layer includes a skip connection. The skip connection is configured with the 1×1 K (depicted as 1×1 conv 302) and the sigmoid activation function (depicted as 308) to extract local features of the histopathological image. In an embodiment, the implemented skip connection enables the extraction of learnable features at each pixel location within the histopathological image. Further, to mitigate the risk of overfitting during training, the skip connection is further enhanced with a dropout operation (depicted as dropout 304) and a batch normalization operation (depicted as BN 306) as illustrated in FIG. 3.

Initially, an input '$x_{l-1}$' 310 is provided as an input to the residual layer 1. The input '$x_{l-1}$' 310 are the global features of the histopathological image. The residual layer 1 is configured to process the input '$x_{l-1}$' 310 to extract the local features of the histopathological image. An output obtained from the set of parallel convolution paths and the sigmoid activation function of the residual layer 1 is combined to generate a combined output. Further, the combined output of the residual layer 1 is processed using two ReLU activation functions, a batch normalization operation (depicted as BN), and a global average pooling (depicted as global pooling). In an embodiment, the global average pooling is employed to introduce spatial invariance in the extracted global features. Furthermore, the ReLU activation functions are applied to the local features to suppress negative values, ensuring that only positively activated local features contribute to subsequent layers. This is followed by the batch normalization operation and the global average pooling, which serve to aggregate the learned features while constraining the combined output dimensionality to match a number of channels in the final convolutional layer of the pretrained dense convolution neural network. Further, an output obtained based on the processing performed by the two ReLU activation functions, the batch normalization operation, and the global average pooling is provided to the residual layer 2.

The residual layer 2 is similar in design to the residual layer 1 but has larger filters (128 and 512 channels) to learn deeper and more complex patterns from the input '$x_{l-1}$' 310. The residual layer 3 has larger filters than the residual layer 2, with 256 and 1024 channels. The residual layer 4 then reduces filter size to 64 and 256 channels. This arrangement of trainable residual layers generates a final output '$x_l$' 312, i.e., the local features. The disclosed architecture of the pretrained dense convolution neural network integrated with the trainable residual layers maintains a compact feature representation without substantial dimensional expansion.

Figure 4:
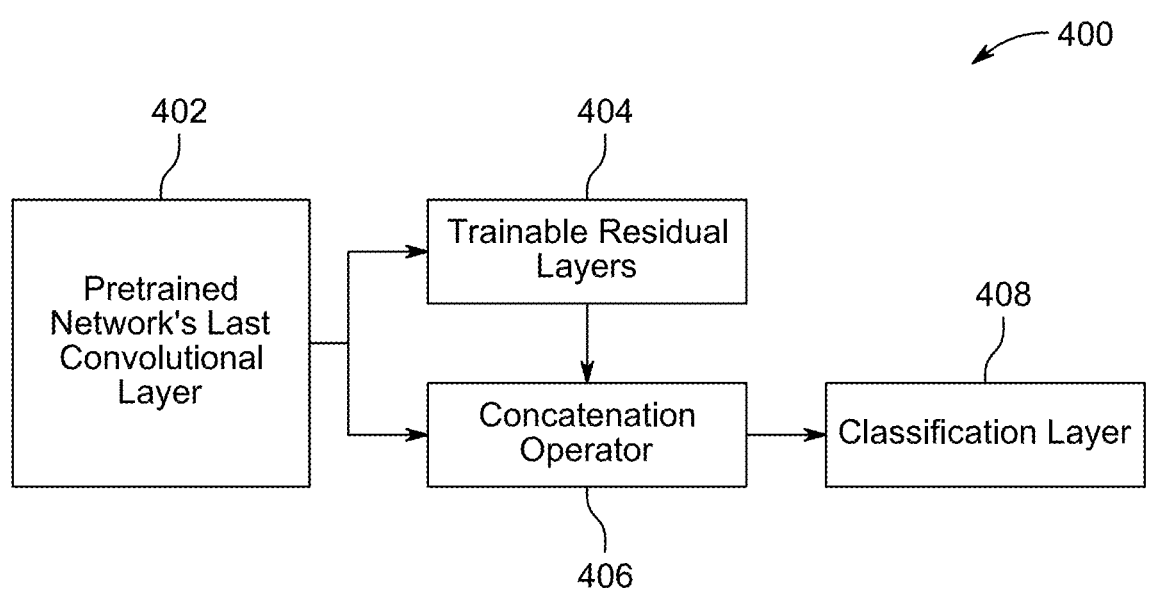
FIG. 4 is an exemplary diagram depicting an architecture of an extended deep-learning network, according to certain embodiments.

Referring now to FIG. 4, the present disclosure provides an exemplary block diagram 400 depicting an architecture of the extended deep-learning network, according to certain embodiments. The extended deep-learning network corresponds to an integration of the pretrained dense convolutional neural network and the trainable residual layers for histopathology image classification. Initially, the pretrained dense convolutional neural network is used to extract the global features of the histopathological image. The global features correspond to the spatial features of the histopathological image. The histopathological image is the microscopic image of the tissue sample (e.g., a breast tissue sample, a lung tissue sample, and the like) used to analyze and diagnose diseases, particularly cancer. The spatial features of the histopathological image include, for example, distribution, shape, orientation, and spatial organization of cells, tissues, and other microscopic structures. At block 402, the output of the final layer (also referred to as the final convolution layer or a last convolution layer) is provided as an input to the trainable residual layers. In block 404, each of the trainable residual layers is configured to extract the local features of the histopathological image. A process of extracting the local features by the trainable residual layers is already explained in FIG. 3. In an embodiment, the local features are spectral features of the histopathological image. The spectral features refer to the fine-grained, localized variations in intensity, color, or texture within small regions of the histopathological image. These spectral features capture subtle patterns and frequency-based details that are crucial for distinguishing similar tissue structures at the cellular level.

At block 406, the global features obtained by the final layer as mentioned in block 402, and the local features extracted at block 404 are concatenated using the concatenation operator. Examples of the concatenation operator can include a tensor concatenation operator, a feature pyramid concatenation operator, a depth concatenation operator, and a skip connection concatenation operator. The global features and the local features of the histopathological image are concatenated to generate the concatenated features. The concatenated features, for example, may include the combination of the average cell size (e.g., the global feature) and the pixel-level texture gradient (e.g., the local feature), the combination of the tissue shape descriptor (e.g., the global feature) and the nucleus color variance (e.g., the local feature).

Once the concatenated features are obtained, at block 408, the classification layer is configured to output the classification of the histopathological image. The classification may be one of the binary classification or the multiclass classification. The binary classification can be configured as one of the benign tissue or the malignant tissue. In other words, the binary classification involves categorizing tissue samples into two groups, i.e., the benign tissue (non-cancerous) or the malignant tissue (cancerous). The multiclass classification of malignant tissue can include, but is not limited to, the DC, the LC, the MC, and the PC. In other words, the multiclass classification further differentiates the tissue samples of the malignant tissue (cancerous) into specific types, such as the DC, the LC, the MC, and the PC. The DC is a common type of breast cancer that begins in the cells lining milk ducts. The LC is a cancer that starts in the milk-producing lobules of the breast. The MC is a rare breast cancer characterized by the production of mucus by tumor cells present in the breast. The PC is a breast cancer type with finger-like projections (papillae) seen under the microscope, typically forming in the milk ducts.

Figure 5:
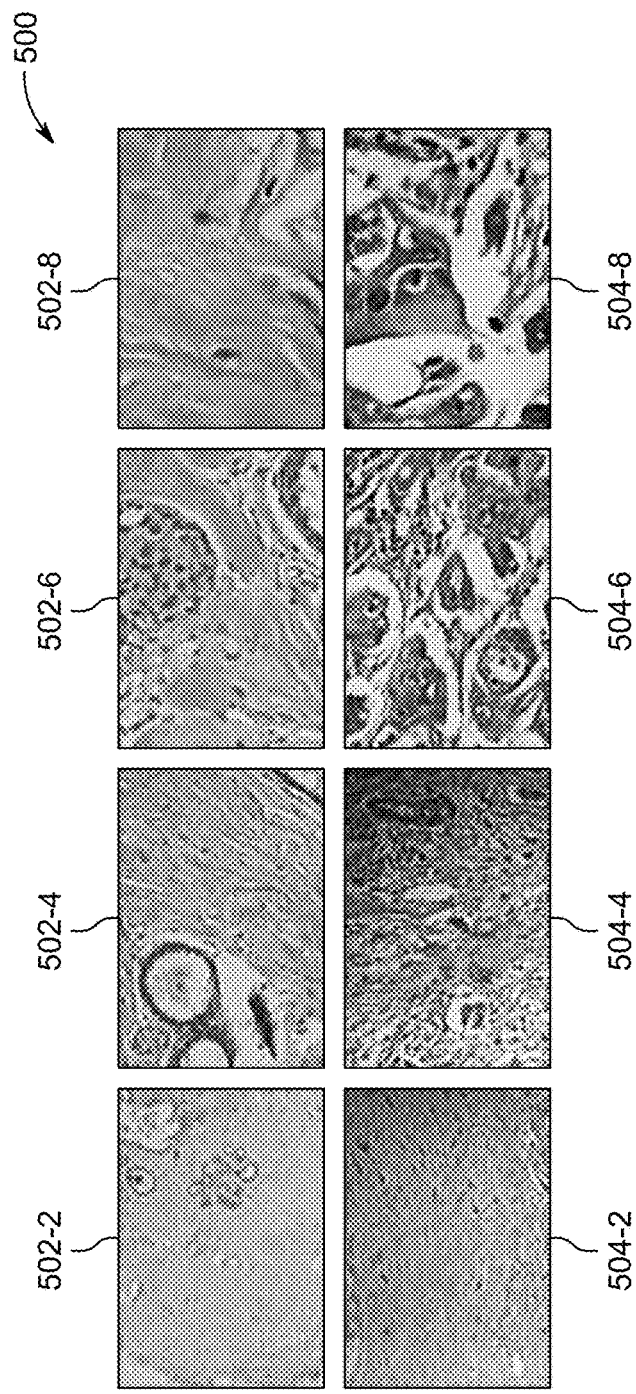
FIG. 5 is an exemplary diagram depicting a set of sample histopathological images, according to certain embodiments.

Referring now to FIG. 5, the present disclosure provides an exemplary diagram 500 depicting a set of sample histopathological images, according to certain embodiments. The set of sample histopathological images may be obtained from a public dataset, for example, a Breast Cancer Histopathological Image Classification (BreakHis) dataset. See Spanhol, F. A.; Oliveira, L. S.; Petitjean, C.; Heutte, L. A Dataset for Breast Cancer Histopathological Image Classification. IEEE Trans. Biomed. Eng. 2015, 63, 1455-1462, incorporated herein in its entirety. The BreakHis dataset is composed of 7909 microscopic images of breast tumor tissue collected from 82 patients using different magnification levels, i.e., 40×, 100×, 200×, and 400×. In particular, the BreakHis dataset includes 7909 microscopic images, including 2480 images associated with the benign tissue and 5429 images associated with the malignant tissue, each with 700×460 resolution A variable 'X' in the different magnification levels depicts a number of times a histopathological image of a breast tissue sample is magnified. For example, 40× depicts that the histopathological image of the breast tissue sample is magnified 40 times to its original size. The set of sample histopathological images demonstrates how benign and malignant tissues appear under the microscope at different magnification levels.

For example, a histopathological image 502-2 displays benign tissue samples observed under the microscope at a magnification level of 40×. Further, a histopathological image 502-4, a histopathological image 502-6, and a histopathological image 502-8 display benign tissue samples observed under the microscope at a magnification level of 100×, 200×, and 400×, respectively. As depicted in the present FIG. 5, the histopathological image 502-2, the histopathological image 502-4, the histopathological image 502-6, and the histopathological image 502-8, displaying benign tissue samples, exhibit an organized structure of breast tissues, indicative of normal or slow-growing cells.

Similarly, a histopathological image 504-2, a histopathological image 504-4, a histopathological image 504-6, and a histopathological image 504-8 display malignant tissue samples observed under the microscope at a magnification level of 40×, 100×, 200×, and 400×, respectively. Further, as depicted in the present FIG. 5, the histopathological image 504-2, the histopathological image 504-4, the histopathological image 504-6, and the histopathological image 504-8, displaying malignant tissue samples, exhibit irregular and disorganized patterns of breast tissues, indicative of potential tumor aggressiveness.

Figure 6:
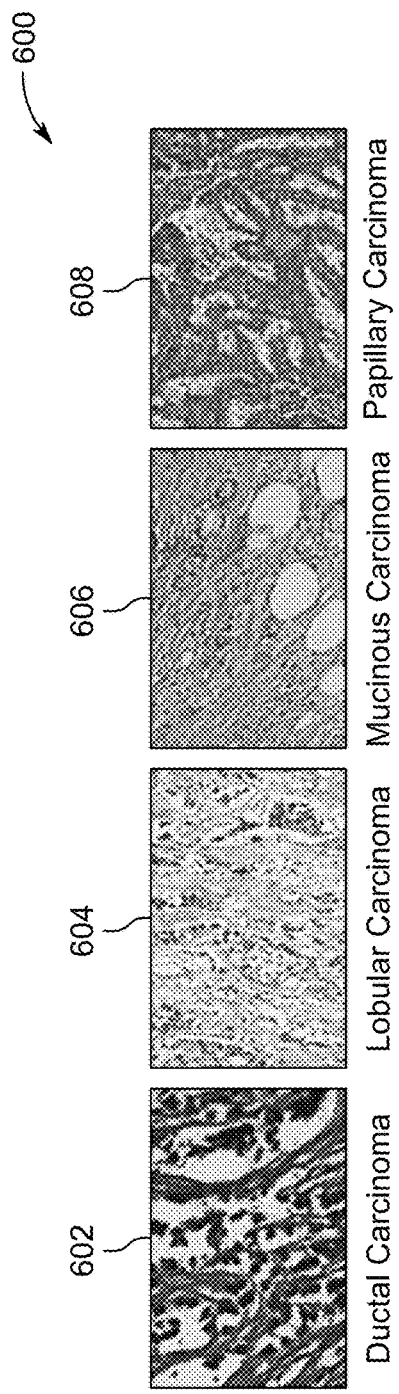
FIG. 6 is an exemplary diagram depicting a set of sample histopathological images of malignant tissue classes, according to certain embodiments.

Referring now to FIG. 6, the present disclosure provides an exemplary diagram 600 depicting a set of sample histopathological images of malignant tissue classes, according to certain embodiments. In an embodiment, the malignant tissue classes correspond to the multiclass classification for histopathological images of the malignant tissue. The malignant tissue classes include the DC, the LC, the MC, the PC, and the like. In FIG. 6, the set of sample histopathological images representing the malignant tissue classes, including the DC, the LC, the MC, and the PC, found in the BreakHis dataset is depicted. For example, a histopathological image 602 represents a malignant tissue class of the DC. The DC is the common type of breast cancer that begins in the cells lining milk ducts. For example, a histopathological image 604 represents a malignant tissue class of the LC. The LC is a type of cancer that is found in the milk-producing lobules of the breast. For example, a histopathological image 606 represents a malignant tissue class of the MC. The MC is a type of breast cancer characterized by the production of mucus by tumor cells present in the breast. For example, a histopathological image 608 represents a malignant tissue class of the PC. The PC is a breast cancer type with presence of finger-like projections (papillae), typically forming in the milk ducts.

Figure 7:
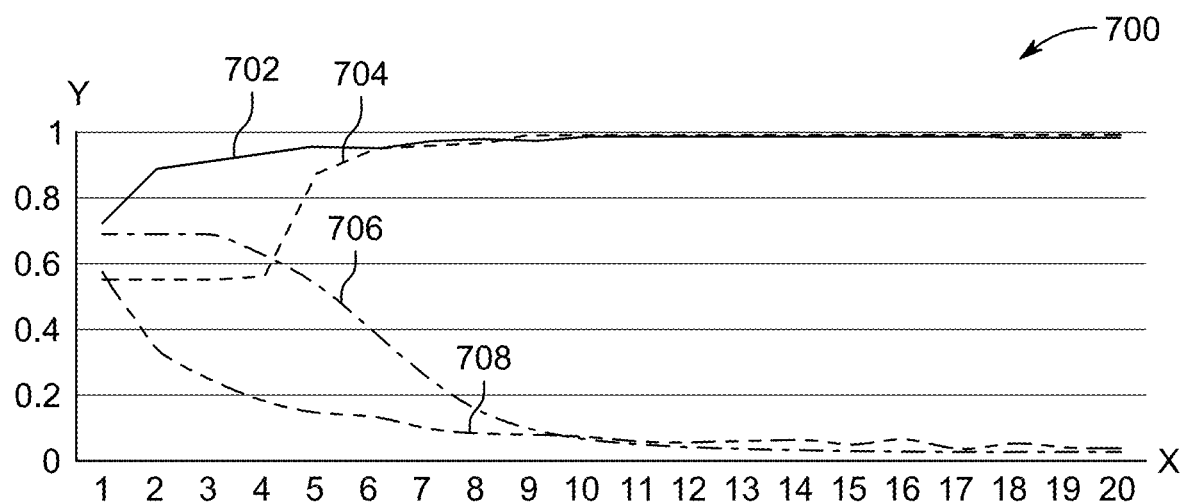
FIG. 7 is an exemplary graph depicting an accuracy and loss analysis of the extended deep-learning network at a 40× magnification level for binary classification, according to certain embodiments.

Referring now to FIG. 7, the present disclosure provides an exemplary graph 700 depicting an accuracy and loss analysis of an extended deep-learning network at a 40× magnification level for binary classification, according to certain embodiments. The extended deep-learning network corresponds to the extended deep-learning network depicted in FIG. 4. In an embodiment, the pretrained dense convolutional neural network is modified by integrating the trainable residual layers after a final convolutional layer (also referred to as the final layer of the plurality of convolution layers) to create the extended deep-learning network. In an embodiment, the extended deep-learning network is evaluated in two distinct phases. In the first phase, the disclosed network architecture is tested for the binary classification, distinguishing between samples of the benign tissue and the malignant tissue. In the second phase, the disclosed network architecture is assessed for the multiclass classification, specifically categorizing malignant tissue samples into one of four subtypes, i.e., the DC, the LC, the MC, and the PC. Further, a holdout validation technique is employed for simulation (i.e., an experimental process of training and evaluating the extended deep-learning network). The holdout validation technique is a technique in which the dataset (e.g., BreakHis dataset) is partitioned into two non-overlapping subsets, i.e., a training dataset used to train the extended deep-learning network, and a testing dataset used to evaluate the performance of the extended deep-learning network.

The experimental process is conducted independently for each magnification level. For each case, the performance of the extended deep-learning network is analyzed using training and testing accuracy and training and testing loss. The results depicting the performance of the disclosed network architecture for the binary classification are visualized in FIG. 7 to FIG. 10, which illustrates the progression of accuracy and loss over the number of epochs for the training and testing datasets.

In particular, the graph 700 represents the accuracy and loss analysis of the extended deep-learning network performed based on 40× magnification level histopathological images for the binary classification, e.g., benign tissue versus malignant tissue. In graph 700, an X-axis represents a number of epochs (e.g., 1-20). Further, a Y-axis represents performance metrics, including loss and accuracy ranging from 0 to 1. A curve 702 depicts the accuracy of the extended deep-learning network observed during the binary classification of histopathological images in the training dataset over time. As depicted via the graph 700, the curve 702 steadily increases and saturates close to 1.0 (100%) by epoch 6, suggesting that the extended deep-learning network quickly learns the training dataset and achieves high accuracy. A curve 704 depicts the accuracy of the extended deep-learning network observed during the binary classification of histopathological images of the testing dataset. The curve 704 climbs steeply until about epoch 6 and plateaus just below 1.0, indicating strong generalization performance with minimal overfitting.

A curve 706 indicates prediction errors made by the extended deep-learning network on the testing dataset. As depicted in the graph 700, the curve 706 is initially higher and decreases over the number of epochs and eventually levels off, confirming good validation performance and low risk of overfitting. A curve 708 represents prediction errors (i.e., loss) made by the extended deep-learning network on the training dataset. The prediction errors may correspond to incorrect predictions made by the extended deep-learning network while performing the binary classification. As depicted in the graph 700, the curve 708 declines sharply, indicating that the extended deep-learning network is learning and minimizing errors effectively on the training dataset.

Figure 8:
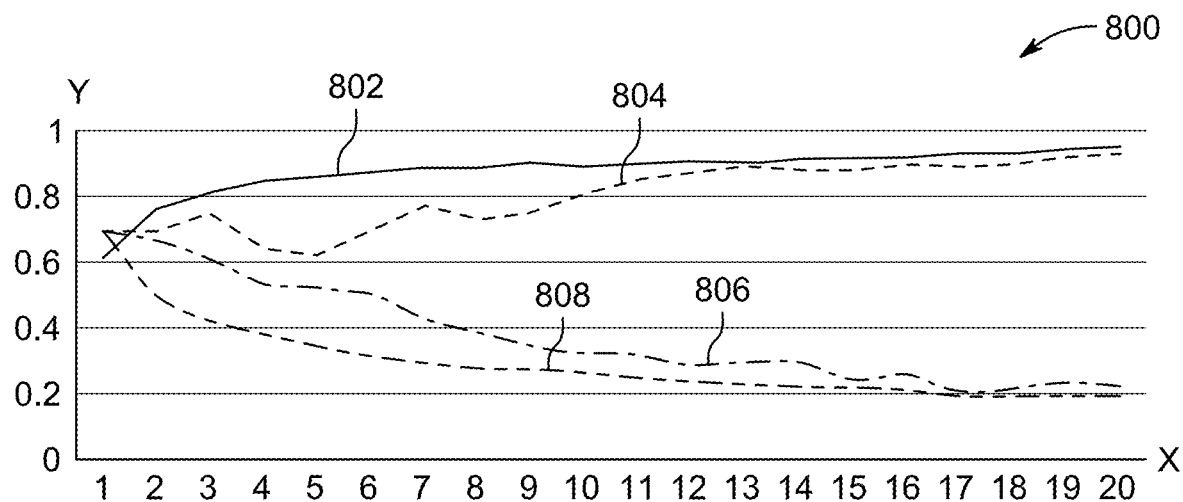
FIG. 8 is an exemplary graph depicting the accuracy and loss analysis of the extended deep-learning network at a 100× magnification level for binary classification, according to certain embodiments.

In an embodiment, as depicted by the graph 700, by epoch 6, both training and testing accuracy curves (i.e., the curve 702 and the curve 704 respectively) reach high values (~1.0), while both training and testing loss curves (i.e., the curve 708 and the curve 706 respectively) flatten near zero. This shows that the extended deep-learning network converges quickly and performs well on both the training dataset and the testing dataset at the 40× magnification level. Referring now to FIG. 8, the present disclosure provides an exemplary graph 800 depicting the accuracy and loss analysis of the extended deep-learning network at a 100× magnification level for binary classification, according to certain embodiments. In particular, the graph 800 represents the accuracy and loss analysis of the extended deep-learning network performed based on histopathological images of 100× magnification level for the binary classification, e.g., benign tissue vs. malignant tissue. In graph 800, an X-axis represents a number of epochs (e.g., 1-20). Further, a Y-axis represents performance metrics, including loss and accuracy, ranging from 0 to 1. A curve 802 depicts the accuracy of the extended deep-learning network observed during the binary classification of histopathological images in the training dataset over time. As depicted in the graph 800, the curve 802 starts around 0.65 (65%) and steadily increases toward 0.95 (95%) as the number of epochs increases, depicting that the extended deep-learning network achieves high accuracy on training dataset over time.

Further, a curve 804 depicts the accuracy of the extended deep-learning network observed during binary classification of histopathological images in the testing dataset. As depicted in the graph 800, the curve 804 initially fluctuates but gradually increases and stabilizes around 0.88-0.90. A curve 806 indicates prediction errors made by the extended deep-learning network on the testing dataset. As depicted in the graph 800, the curve 806 deceases gradually, indicating the extended deep-learning network is generalizing well on the unseen testing dataset. A curve 808 represents prediction errors made by the extended deep-learning network on the training dataset. As depicted in the graph 800, the curve 808 starts relatively high and decreases steadily, indicating that the extended deep-learning network is learning and minimizing errors effectively on the training dataset.

In an embodiment, as depicted by the graph 800, by epoch 10, both training and testing accuracy curves (i.e., the curve 802 and the curve 804 respectively) reach high values (~0.9-1.0), while both training and testing loss curves (i.e., the curve 808 and the curve 806 respectively) flatten near zero. This demonstrates that the extended deep-learning network converges efficiently and maintains strong performance on both the training dataset and the unseen testing dataset at the 100× magnification level.

Figure 9:
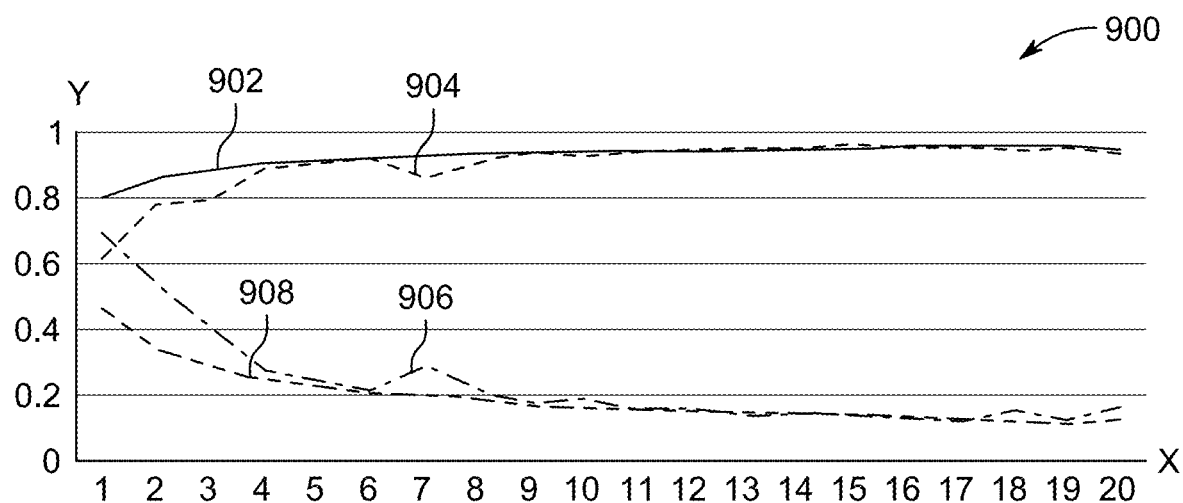
FIG. 9 is an exemplary graph depicting the accuracy and loss analysis of the extended deep-learning network at a 200× magnification level for binary classification, according to certain embodiments.

Referring now to FIG. 9, the present disclosure provides an exemplary graph 900 depicting the accuracy and loss analysis of the extended deep-learning network at a 200× magnification level for binary classification, according to certain embodiments. In particular, the graph 900 represents the accuracy and loss analysis of the extended deep-learning network performed based on histopathological images of 200× magnification level for the binary classification, e.g., benign tissue vs. malignant tissue. In graph 900, an X-axis represents a number of epochs (e.g., 1-20). Further, a Y-axis represents performance metrics, including loss and accuracy, ranging from 0 to 1. A curve 902 depicts the accuracy of the extended deep-learning network observed during binary classification of histopathological images in the training dataset over time. As illustrated in the graph 900, the curve 902 starts around 0.8 and consistently rises, stabilizing close to 0.95, indicating strong learning and high classification accuracy on the training dataset.

A curve 904 shows the accuracy of the extended deep-learning network on the testing dataset. As seen in the graph 900, the curve 904 rises sharply during the early epochs, briefly fluctuates around epochs 6 to 8, and then stabilizes above 0.90, reflecting good generalization capability on the testing dataset. Further, a curve 906 indicates the prediction errors made on the testing dataset. The curve 906 starts relatively high and steadily decreases across the number of epochs, flattening near zero, suggesting improved performance and error minimization on the testing dataset. Further, a curve 908 represents the prediction errors on the training dataset. The curve 908 starts at a moderately high value and steadily decreases over time, showing that the extended deep-learning network is effectively learning and reducing training errors with each epoch.

Figure 10:
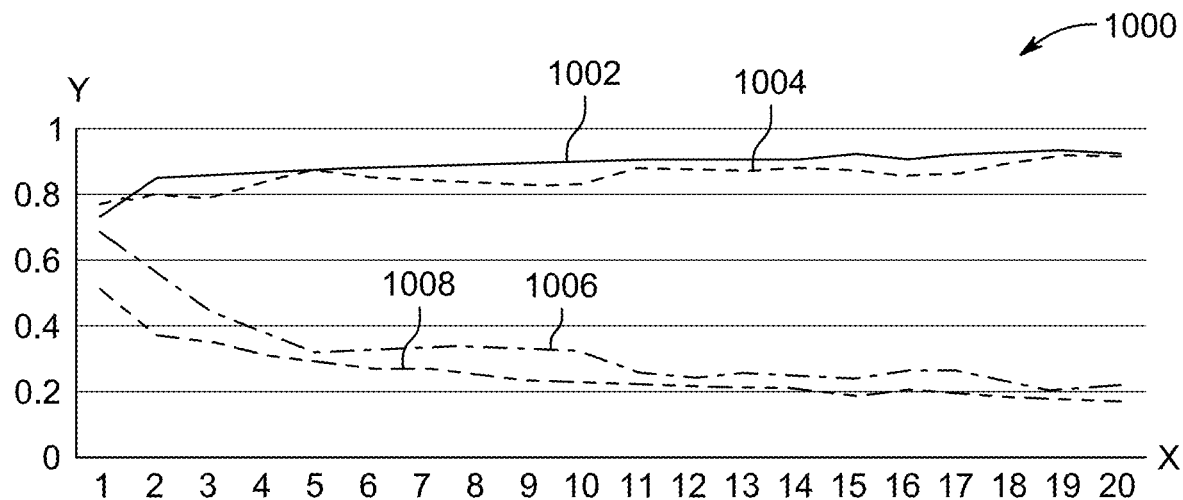
FIG. 10 is an exemplary graph depicting the accuracy and loss analysis of the extended deep-learning network at a 400× magnification level for binary classification, according to certain embodiments.

Referring now to FIG. 10, the present disclosure provides an exemplary graph 1000 depicting the accuracy and loss analysis of the extended deep-learning network at a 400× magnification level for binary classification, according to certain embodiments. In particular, the graph 1000 represents the accuracy and loss analysis of the extended deep-learning network performed based on histopathological images of 400× magnification level for binary classification, e.g., benign tissue versus malignant tissue. In graph 1000, an X-axis represents a number of epochs (e.g., 1-20). Further, a Y-axis represents performance metrics, including loss and accuracy, ranging from 0 to 1. A curve 1002 depicts the accuracy of the extended deep-learning network observed during binary classification of histopathological images using the training dataset, over time. As depicted in the graph 1000, the curve 1002 starts around 0.75 and steadily increases toward 0.95 as the number of epochs increases, depicting that the extended deep-learning network achieves high accuracy on the training dataset over time.

Further, a curve 1004 depicts the accuracy of the extended deep-learning network observed during binary classification of histopathological images of the testing dataset. As depicted in the graph 1000, the curve 1004 initially rises sharply and stabilizes around 0.88-0.90. Further, a curve 1006 indicates prediction errors made by the extended deep-learning network on the testing dataset. As depicted in the graph 1000, the curve 1006 drops significantly within the first few epochs and then flattens, indicating the extended deep-learning network is generalizing well on the testing dataset. A curve 1008 represents prediction errors made by the extended deep-learning network on the training dataset. As depicted in the graph 1000, the curve 1008 begins relatively high and decreases consistently, indicating that the extended deep-learning network is learning and minimizing errors effectively on the training dataset.

In an embodiment, as depicted by the graph 1000, by epoch 10, both training and testing accuracy curves (i.e., the curve 1002 and the curve 1004 respectively) reach high values (~0.9-1.0), while both training and testing loss curves (i.e., the curve 1008 and the curve 1006 respectively) flatten near zero. The graph 1000 demonstrates that the extended deep-learning network converges efficiently and maintains strong performance on both the training dataset and the testing dataset.

Table 1 presents the performance evaluation of the extended deep-learning network performed using four standard metrics, i.e., precision, recall, accuracy, and F1 score (i.e., a harmonic mean of precision and recall). These standard metrics are derived from the following classification outcomes, i.e., True Positives (TP), False Positives (FP), False Negatives (FN), and True Negatives (TN). The TP corresponds to correctly identified positive instances (i.e., correctly classified benign tissue cases). The FP corresponds to negative instances incorrectly classified as positive (i.e., malignant tissue cases misclassified as benign tissue cases). Further, the FN corresponds to positive instances incorrectly classified as negative (i.e., benign tissue cases misclassified as malignant tissue cases). Further, the TN corresponds to correctly identifying negative instances (i.e., correctly classified malignant tissue cases). Using these four standard metrics, the precision, recall, accuracy, and F1 score values are computed as defined in equations 2, 3, 4, and 5, respectively.

$$\text{Precision} = \frac{TP}{(TP + FP)} \quad (2)$$

$$\text{Recall} = \frac{TP}{(TP + FN)} \quad (3)$$

$$\text{Accuracy} = \frac{(TP + TN)}{(TP + FP + TN + FN)} \quad (4)$$

$$F1 \text{ score} = \frac{2\,TP}{(2xTP + FP + FN)} \quad (5)$$

In particular, the Table 1 shows the performance analysis performed for the extended deep-learning network using the testing dataset for binary classification.

TABLE 1

Performance of extended deep-learning network for binary classification

| Magnification Level | TP | FP | FN | TN | Precision | Recall | Accuracy | F1 score |
|---|---|---|---|---|---|---|---|---|
| 40X | 42 | 0 | 0 | 52 | 100 | 100 | 100 | 100 |
| 100X | 163 | 19 | 2 | 272 | 89.56 | 98.78 | 95.39 | 93.94 |
| 200X | 147 | 18 | 1 | 274 | 89.09 | 99.32 | 95.68 | 93.92 |
| 400X | 142 | 14 | 7 | 230 | 91.02 | 95.30 | 94.65 | 93.11 |

As depicted via Table 1, for the binary classification, the extended deep-learning network achieved an average accuracy of 96% across histopathological images at various magnification levels. Notably, the extended deep-learning network reached 100% test accuracy on histopathological images magnified at the 40× magnification level, and 94.65% accuracy at the 400× magnification level. In an embodiment, the extended deep-learning network operates on histopathological image patches extracted from high-resolution histopathological slides.

In the context of cancer classification, minimizing the misclassification of malignant tissue cases is critical, as high recall values are essential for clinical reliability. The experimental results depicted in Table 1 demonstrated a high average recall of 98.32%, indicating the extended deep-learning network's strong capability in correctly identifying malignant tissue cases.

Figure 11:
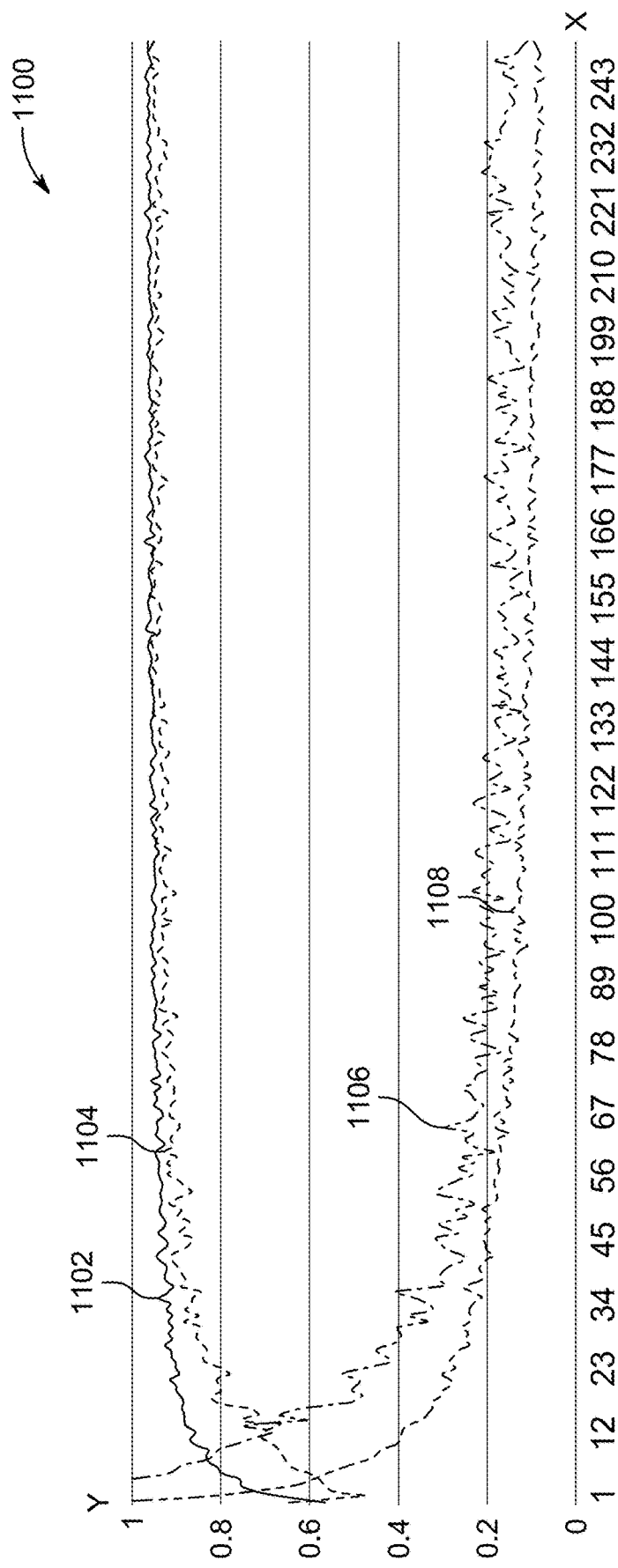
FIG. 11 is an exemplary graph depicting the accuracy and loss analysis of the extended deep-learning network at a 40× magnification level for malignant tissue image classification, according to certain embodiments.

Referring now to FIG. 11, the present disclosure provides an exemplary graph 1100 depicting the accuracy and loss analysis of the extended deep-learning network at a 40× magnification level for malignant tissue image classification, according to certain embodiments. In particular, a training dataset and a testing dataset are used for validating the performance of the extended deep-learning network. The training dataset and the testing dataset may include histopathological images having the 40× magnification level, e.g., the histopathological image 504-2. In particular, the graph 1100 represents the accuracy and loss analysis of the extended deep-learning network performed on the histopathological images at the 40× magnification level for malignant tissue images classification. In graph 1100, an X-axis represents the number of epochs (e.g., 1-243). Further, a Y-axis represents scaled values of loss and accuracy, ranging from 0 to 1. A curve 1102 represents the accuracy of the extended deep-learning network observed during training of the extended deep-learning network for performing the multiclass classification of malignant tissue in the histopathological images present in the training dataset. As shown in the graph 1100, the curve 1102 starts around 0.6 and rapidly increases during the first few epochs, eventually stabilizing above 0.95 as training progresses. This trend, followed by the curve 1102, demonstrates that the extended deep-learning network quickly learns to classify malignant tissue images accurately in the training dataset. A curve 1104 depicts the accuracy of the extended deep-learning network observed during testing of the proposed network architecture for the multiclass classification of malignant tissue using the testing dataset. The curve initially rises steeply and stabilizes around 0.95 after the early epochs, depicting consistent and strong performance of the extended deep-learning network on the testing dataset.

A curve 1106 shows the loss (i.e., prediction errors) observed during evaluation of the extended deep-learning network on the unseen test dataset. As depicted, the curve 1106 decreases significantly and remains relatively low throughout the number of epochs, indicating that the extended deep-learning network maintains low prediction errors on the unseen training dataset and generalizes well. Lastly, a curve 1108 indicates the loss observed during evaluation of the extended deep-learning network performed using the training dataset. As depicted, the curve 1108 begins at a high value (approximately 1) and decreases steeply within the initial epochs, eventually flattening near zero. This steady decline depicted by the curve 1108 reflects the extended deep-learning network, effective learning, and minimization of prediction errors on the training dataset and the testing dataset at the 400× magnification level. In an embodiment, the graph 1100 illustrates that the extended deep-learning network converges efficiently and maintains robust classification performance across both the training dataset and the testing dataset at the 40× magnification level.

Figure 12:
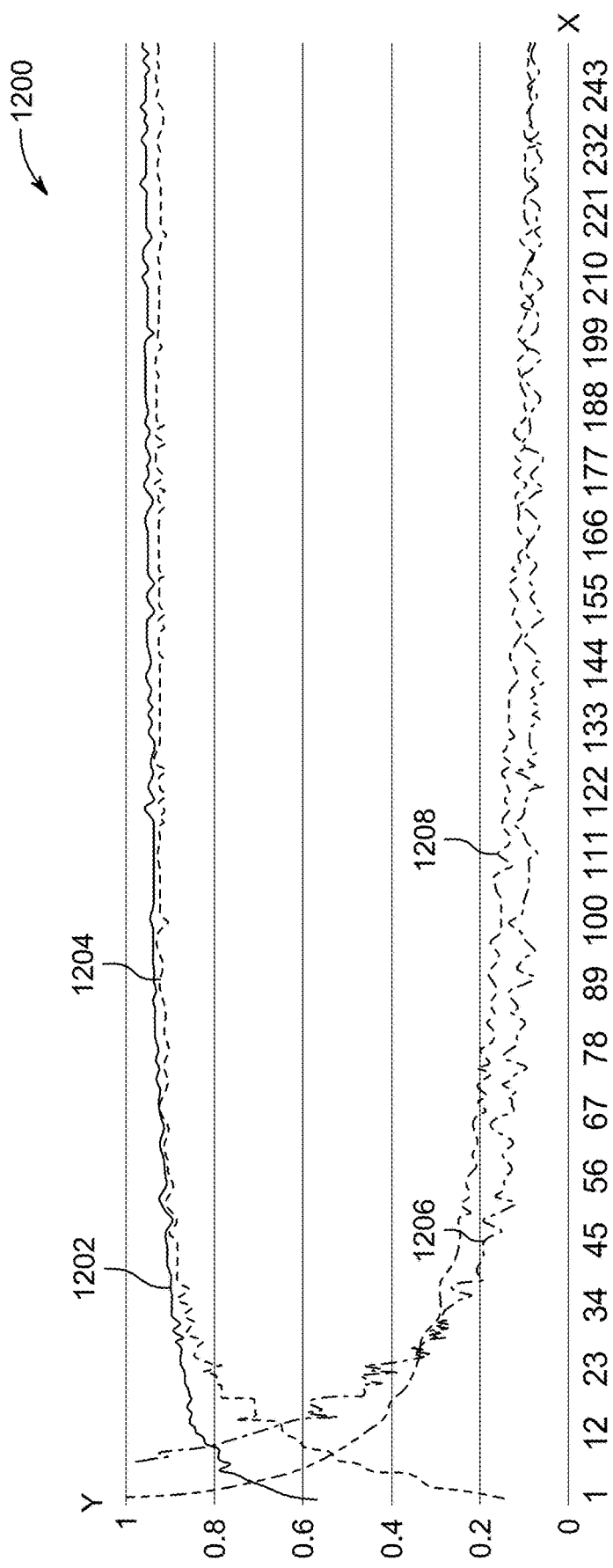
FIG. 12 is an exemplary graph depicting the accuracy and loss analysis of the extended deep-learning network at a 100× magnification level for malignant tissue image classification, according to certain embodiments.

Referring now to FIG. 12, the present disclosure provides an exemplary graph 1200 depicting the accuracy and loss analysis of the extended deep-learning network at a 100× magnification level for malignant tissue image classification, according to certain embodiments. In particular, the graph 1200 represents the accuracy and loss analysis of the extended deep-learning network performed using histopathological images at the 100× magnification level for malignant tissue image classification. In other words, the training dataset and the testing dataset used for analyzing the performance of the extended deep-learning network may include histopathological images having the 100× magnification level, e.g., the histopathological image 504-4.

In the graph 1200, an X-axis represents the number of epochs (e.g., 1-243). Further, a Y-axis represents scaled values of loss and accuracy, ranging from 0 to 1. A curve 1202 represents the accuracy of the extended deep-learning network observed during training of the extended deep-learning network using the training dataset. As shown in the graph 1200, the curve 1202 starts around 0.6 and rapidly increases during the first few epochs, eventually stabilizing above 0.95 as training progresses. This trend, followed by the curve 1202, demonstrates that the extended deep-learning network quickly learns to classify malignant tissue images accurately in the training dataset. A curve 1204 depicts the accuracy of the extended deep-learning network observed during testing of the extended deep-learning network performed using the unseen testing dataset. The curve 1204 initially rises steeply and stabilizes around 0.95 after the early epochs, depicting consistent and strong performance of the extended deep-learning network on the testing dataset.

A curve 1206 shows the loss (i.e., prediction errors) observed during evaluation of the extended deep-learning network performed using the testing dataset. As depicted, the curve 1206 decreases significantly within the first few epochs and remains relatively low throughout the number of epochs, indicating that the extended deep-learning network maintains low prediction errors on the testing dataset and generalizes well. Lastly, a curve 1208 indicates the loss observed during evaluation of the proposed network architecture performed using the training dataset. As depicted, the curve 1208 begins at a high value and decreases steeply within the initial epochs, eventually flattening near zero, depicting effective learning and minimization of prediction errors on the training dataset. In an embodiment, the graph 1200 illustrates that extended deep-learning network converges efficiently and maintains robust classification performance across both the training dataset and the unseen testing dataset at the 100× magnification level.

Figure 13:
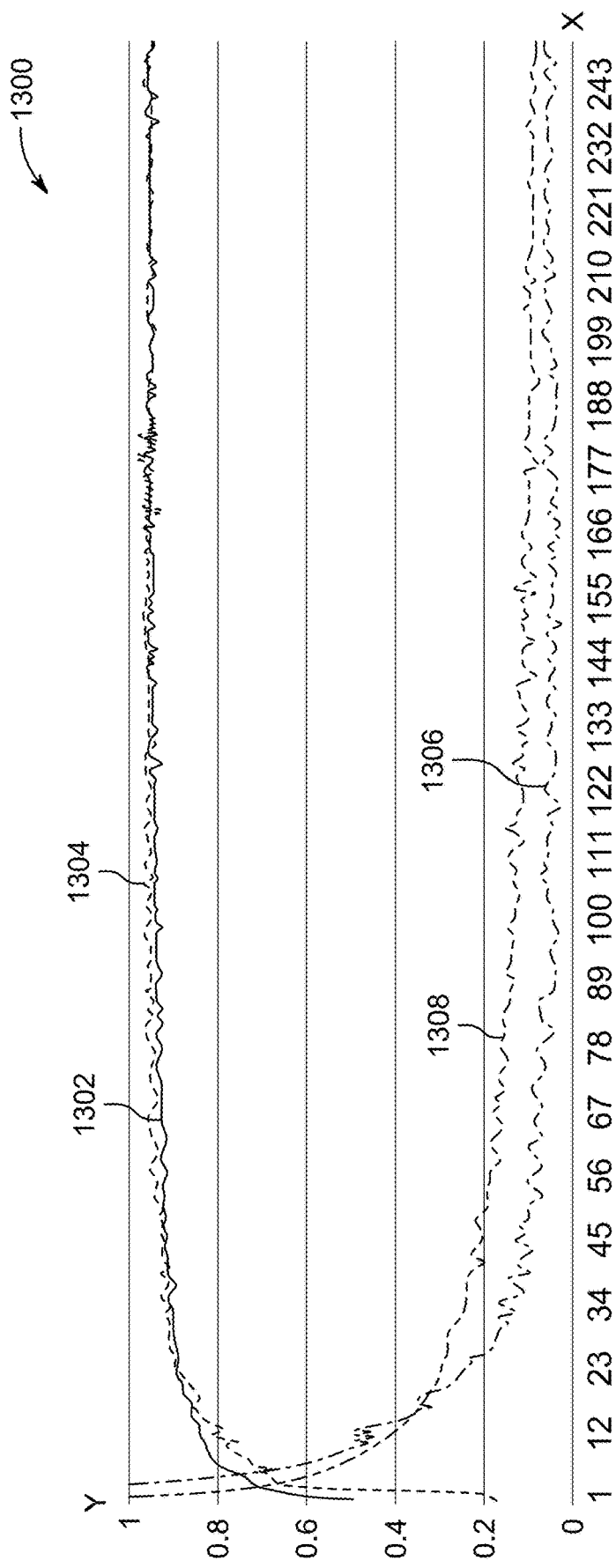
FIG. 13 is an exemplary graph displaying the accuracy and loss analysis of the extended deep-learning network at a 200× magnification level for malignant tissue image classification, according to certain embodiments.

Referring now to FIG. 13, the present disclosure provides an exemplary graph 1300 displaying the accuracy and loss analysis of the extended deep-learning network at a 200× magnification level for malignant tissue image classification, according to certain embodiments. Similar to FIG. 11 and FIG. 12, the graph 1300 represents the accuracy and loss analysis of the extended deep-learning network performed using histopathological images at the 200× magnification level for malignant tissue image classification. In other words, the training dataset and the testing dataset used for analyzing the performance of the extended deep-learning network may include histopathological images having the 200× magnification level, e.g., the histopathological image 504-6.

In graph 1300, an X-axis represents the number of epochs (e.g., 1-243). Further, a Y-axis represents scaled values of loss and accuracy, ranging from 0 to 1. A curve 1302 represents the accuracy of the extended deep-learning network observed during training of the extended deep-learning network using the training dataset. A curve 1304 depicts the accuracy of the extended deep-learning network observed during testing of the extended deep-learning network performed using the testing dataset. A curve 1306 shows the loss (i.e., prediction errors) observed during evaluation of the extended deep-learning network performed using the testing dataset. Lastly, a curve 1308 indicates the loss observed during evaluation of the extended deep-learning network performed using the training dataset. In an embodiment, the graph 1300 illustrates that the extended deep-learning network converges efficiently and maintains robust classification performance across both the training dataset and the testing dataset at the 200× magnification level.

Figure 14:
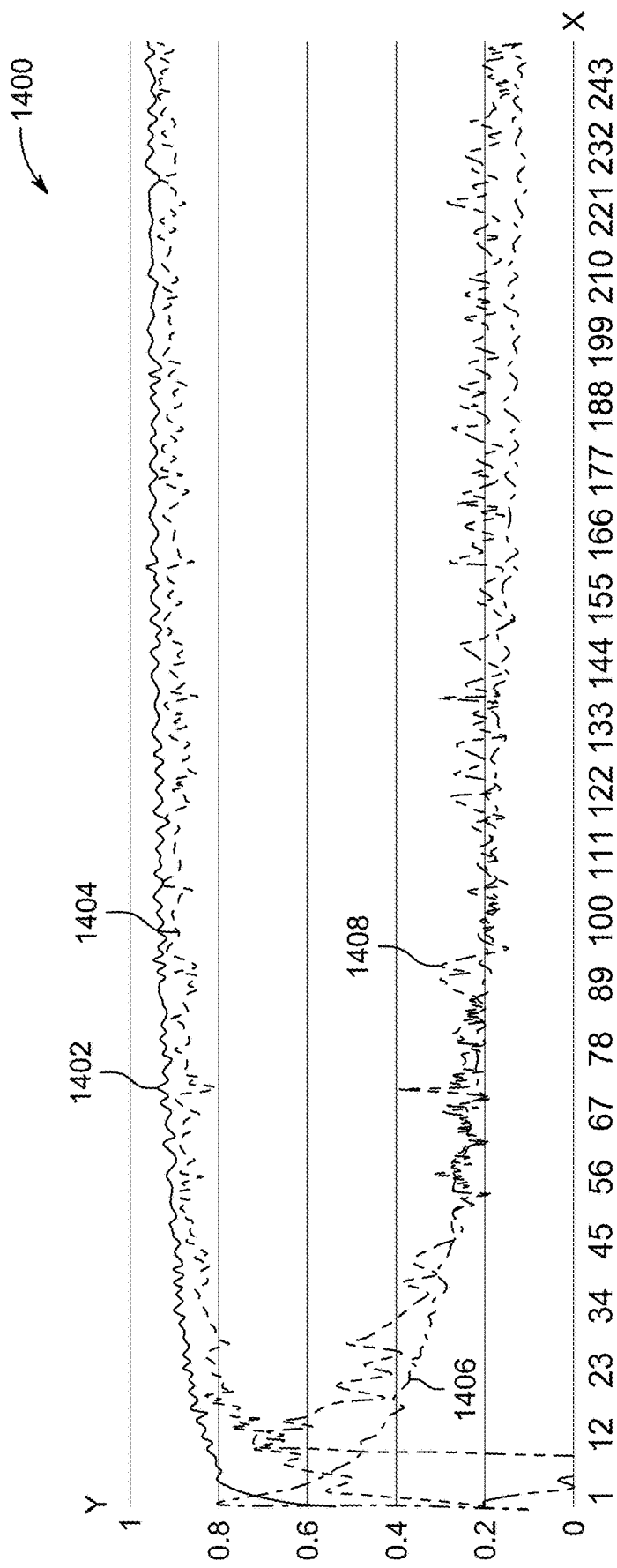
FIG. 14 is an exemplary graph displaying an accuracy and loss analysis of the extended deep-learning network at the 400× magnification factor for malignant tissue image classification, according to certain embodiments.

Referring now to FIG. 14, the present disclosure provides an exemplary graph 1400 displaying the accuracy and loss analysis of the extended deep-learning network at a 400× magnification level for malignant tissue image classification, according to certain embodiments. Similar to FIGS. 11, 12, and 13, the graph 1400 represents the accuracy and loss analysis of the extended deep-learning network performed using histopathological images at the 400× magnification level for malignant tissue image classification. In other words, the training dataset and the testing dataset used for analyzing the performance of the extended deep-learning network may include histopathological images having the 400× magnification level, e.g., the histopathological image 504-8.

In graph 1400, an X-axis represents the number of epochs (e.g., 1-243). Further, a Y-axis represents scaled values of loss and accuracy, ranging from 0 to 1. A curve 1402 represents the accuracy of the extended deep-learning network observed during training of the extended deep-learning network using the training dataset. A curve 1404 depicts the accuracy of the extended deep-learning network observed during testing of the extended deep-learning network performed using the testing dataset. A curve 1406 indicates the loss observed during evaluation of the extended deep-learning network performed using the training dataset. Lastly, a curve 1408 shows the loss (i.e., prediction errors) observed during evaluation of the extended deep-learning network performed using the testing dataset. In an embodiment, the graph 1400 illustrates that the extended deep-learning network converges efficiently and maintains robust classification performance across both the training dataset and the testing dataset at the 400× magnification level.

In an embodiment, the graphs in FIGS. 11-14 depict the accuracy and loss evaluated for the extended deep-learning network using both the training dataset and testing dataset for the multiclass classification of malignant tissue samples for over 250 epochs. It is evident from the graphs in the FIGS. 11-14 that training and testing accuracies are increasing over epochs, and a small deviation between them shows that the extended deep-learning network is not overfitted.

Remarkably, the extended deep-learning network surpassed 95% test accuracy within just 73 epochs. For the 400× magnification level, the testing loss continuously decreased, eventually reaching as low as 0.2%, suggesting that further training may yield only marginal gains. Further, minor fluctuations observed in the loss curves (e.g., the curve 1106, the curve 1108, the curve 1206, the curve 1208, etc.) are likely attributed to the presence of noisy or low-quality image patches in the training and the testing datasets.

A Table 2 below summarizes the extended deep-learning network's performance in classifying the histopathological images with malignant tissue samples.

TABLE 2

Performance of extended deep-learning network for multiclass classification of malignant tissue sample images

| Magnification Level | TP | FP | FN | TN | Precision | Recall | Accuracy | F1 score |
|---|---|---|---|---|---|---|---|---|
| DC 40X | 154 | 3 | 8 | 105 | 98.09 | 95.06 | 95.93 | 96.55 |
| DC 100X | 168 | 6 | 7 | 111 | 96.55 | 96.00 | 95.55 | 96.28 |
| DC 200X | 38 | 1 | 2 | 186 | 97.44 | 95.00 | 96.68 | 96.20 |
| DC 400X | 35 | 3 | 3 | 200 | 92.11 | 92.11 | 97.51 | 92.11 |
| LC 40X | 35 | 2 | 3 | 230 | 94.59 | 92.11 | 98.15 | 93.33 |
| LC 100X | 34 | 2 | 3 | 253 | 94.44 | 91.89 | 98.29 | 93.15 |
| LC 200X | 116 | 3 | 7 | 101 | 97.48 | 94.31 | 95.59 | 95.87 |
| LC 400X | 134 | 5 | 8 | 94 | 96.40 | 94.37 | 94.61 | 95.37 |
| MC 40X | 40 | 4 | 1 | 225 | 90.91 | 97.56 | 98.15 | 94.12 |
| MC 100X | 42 | 5 | 5 | 240 | 89.36 | 89.36 | 96.58 | 89.36 |
| MC 200X | 31 | 4 | 3 | 189 | 88.57 | 91.18 | 96.92 | 89.86 |
| MC 400X | 31 | 2 | 3 | 205 | 93.94 | 91.18 | 97.93 | 92.54 |
| PC 40X | 28 | 4 | 1 | 237 | 87.50 | 96.55 | 98.15 | 91.80 |
| PC 100X | 29 | 6 | 3 | 231 | 82.86 | 90.63 | 96.65 | 86.57 |
| PC 200X | 30 | 4 | 0 | 193 | 88.24 | 100.0 | 98.24 | 93.75 |
| PC 400X | 30 | 1 | 2 | 208 | 96.77 | 93.76 | 98.76 | 95.24 |

As depicted via Table 2, the average testing accuracy across all magnification levels reached 97.21%. The extended deep-learning network consistently identified the histopathological images of malignant tissue samples with the DC, the LC, and the MC with high accuracy across all magnification levels Further, the classification accuracy for the histopathological images of malignant tissue samples with the PC remained above 95%, indicating that the extended deep-learning network is capable of correctly predicting most true cases. The lowest accuracy and F1-score recorded by the extended deep-learning network were 95.55% and 86.57%, respectively. Overall, the results suggest that the extended deep-learning network is robust and well-trained, demonstrating strong generalization and particularly high performance in performing the multiclass classification and the binary classification.

Figure 15:
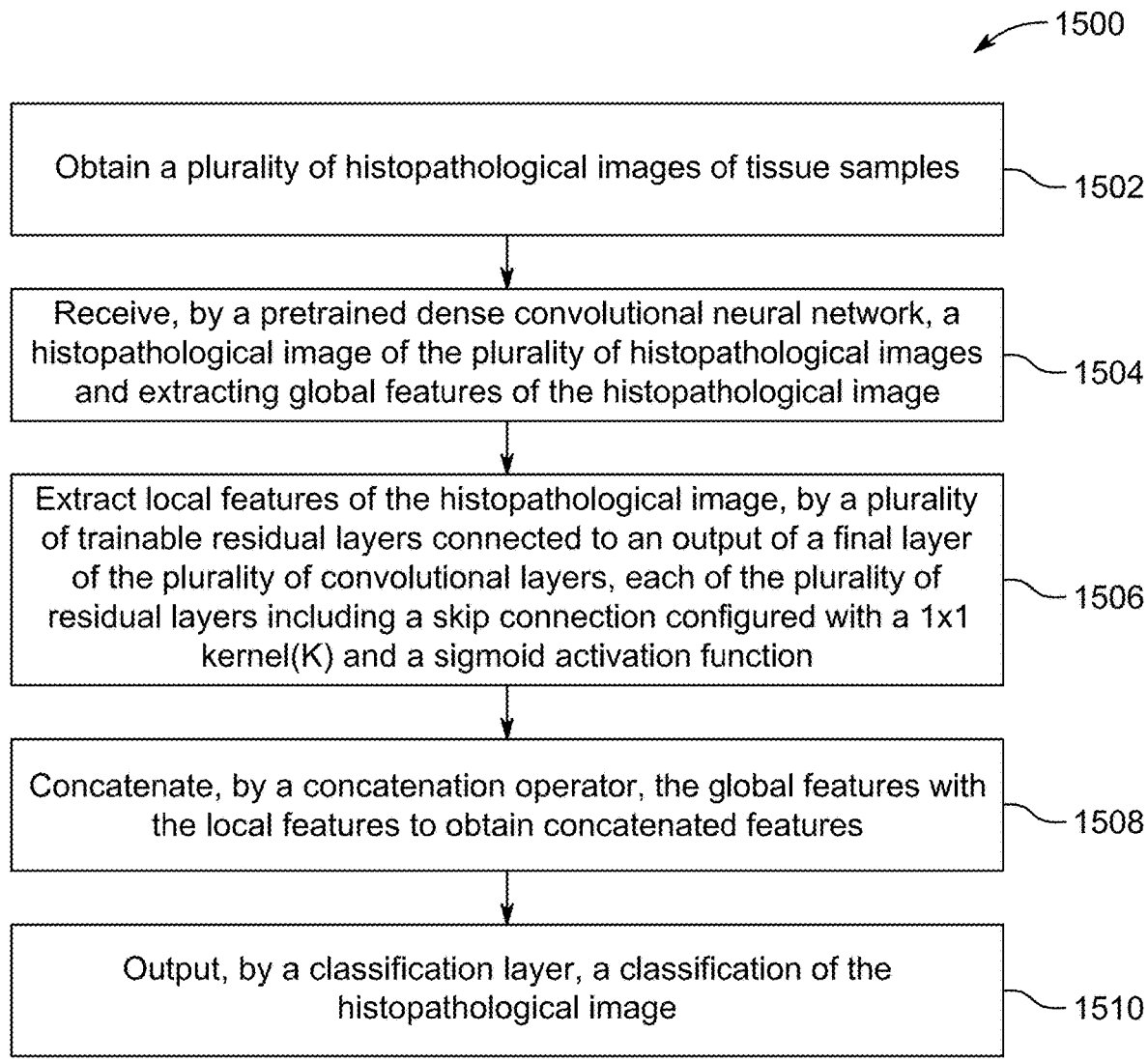
FIG. 15 is an exemplary diagram of a method of diagnostic assistance, according to certain embodiments.

Referring now to FIG. 15, the present disclosure provides an exemplary diagram of a method 1500 of diagnostic assistance, according to certain embodiments. In order to provide diagnostic assistance to users (e.g., medical professionals), initially, at step 1502, the histopathological images of tissue samples is previously obtained. In an embodiment, the histopathological images of tissue samples are obtained from breast tissue samples observed with the microscope. In some embodiments, the histopathological images of tissue samples are captured using the camera-mounted microscope or the whole-slide scanner. In particular, the camera-mounted microscope or the whole-slide scanner is configured to capture images of the tissue specimen associated with the breast to obtain the histopathological images. Further, these captured images are transferred to a mobile device (e.g., the user device 112) configured with the processing circuitry 106 of the computing device 102. In an embodiment, the histopathological image is the microscopic image of the tissue sample used to analyze and diagnose a disease, particularly cancer. The histopathological image is crucial for medical professionals to identify abnormal cell structures, tissue architecture, and other disease-related features. In some embodiments, apart from obtaining the histopathological images of tissue samples from breast tissue samples, the histopathological images of tissue samples can be obtained from lung tissue samples, thyroid tissue samples, cervical tissue samples, and other tissues.

Once the histopathological images are obtained, at step 1504, the histopathological image of the histopathological images is received by the pretrained dense convolutional neural network. In an embodiment, the pretrained dense convolutional neural network includes the convolutional layers. The pretrained dense convolutional neural network is configured with all of the convolutional layers directly connected with each other. In an embodiment, the pretrained dense convolutional neural network is configured to extract global features of the histopathological image. To extract the global features, each convolutional layer of the pretrained dense convolutional neural network is configured to obtain additional inputs from all preceding convolutional layers and pass on its own feature-map to all subsequent convolutional layers. In other words, each convolutional layer's output is shared with an associated subsequent convolutional layer. The additional inputs may correspond to results generated by a current convolution layer that is further passed to all subsequent convolutional layers. In an embodiment, the global features are the spatial features of the histopathological image. The spatial features of the histopathological image include, for example, distribution, shape, orientation, and spatial organization of cells, tissues, and other microscopic structures, which are critical for understanding the overall architecture of the tissue samples.

Once the global features are extracted, at step 1506, the local features of the histopathological image are extracted by the trainable residual layers. The trainable residual layers are connected to an output of the final layer of the convolutional layers. In an embodiment, each of the residual layers includes a skip connection. The skip connection is configured with the 1×1 K and the sigmoid activation function. The 1×1 K in the skip connection generates learned features obtained from the global features at each pixel location in the histopathological image. Further, the sigmoid activation function determines the difference between the learned features and the global features output from the pretrained dense convolutional neural network. The skip connection associated with each of the trainable residual layers is explained in detail in conjunction with FIG. 3 and FIG. 4. In an embodiment, the local features are the spectral features of the histopathological image. The spectral features refer to the fine-grained, localized variations in intensity, color, or texture within small regions of the histopathological image. These spectral features capture subtle patterns and frequency-based details that are crucial for distinguishing similar tissue structures at a cellular level. In an embodiment, the pretrained dense convolutional neural network modified with the trainable residual layers is trained to determine the global features and the local features of the histopathological image.

Upon extracting the global features and the local features from the histopathological image, at step 1508, the global features and the local features are concatenated to obtain concatenated features. The concatenation of the global features and the local features may be performed using the concatenation operator. A concatenated feature may be the combination of at least one global feature (e.g., the average cell size, the tissue shape descriptor, etc.) and at least one local feature (e.g., the pixel-level texture gradient, the nucleus color variance).

Once the concatenated features are obtained, at step 1510, the classification of the histopathological image is outputted by the classification layer. In an embodiment, the classification layer is connected to the output of the concatenation operator. Further, the classification of the histopathological image is the binary classification, i.e., benign tissue or malignant tissue. Upon detecting the classification of the histopathological image to be the malignant (also referred to as malignant), the multiclass classification for the histopathological image of the malignant tissue is performed. The multiclass classification of the malignant tissue may include, but is not limited to, the DC, the LC, the MC, and the PC. Further, the output of classification is used by the user to provide suitable medical assistance to the patient.

The present disclosure introduces an advanced convolutional neural network architecture (also referred to as the extended deep-learning network) for histopathological images to optimize clinical pathology workflows. By integrating trainable residual layers with the pretrained dense convolutional neural network (e.g., a DenseNet161), the extended deep-learning network delivers enhanced feature extraction capabilities while maintaining compatibility with established deep learning models such as a Visual Geometry Group (VGG), a Residual Network (ResNet), and an Efficient Neural Network (EfficientNet). This hybrid approach of integrating the trainable residual layers with the pretrained dense convolutional neural network significantly improves classification accuracy and efficiency across varying histopathological image magnification levels without requiring extensive retraining. Designed for adaptability and scalability, the present disclosure supports real-time histopathological image analysis, enabling dynamic learning and generalization to new datasets. Moreover, experimental evaluation of the extended deep-learning network demonstrated reliable performance across diverse cancer subtypes with reduced processing time, making it well-suited for deployment in clinical diagnostic settings. The integration of residual learning facilitates rapid convergence, improved diagnostic precision, and consistent operation, thereby supporting more accurate clinical decision-making and contributing to improved patient outcomes.

Figure 16:
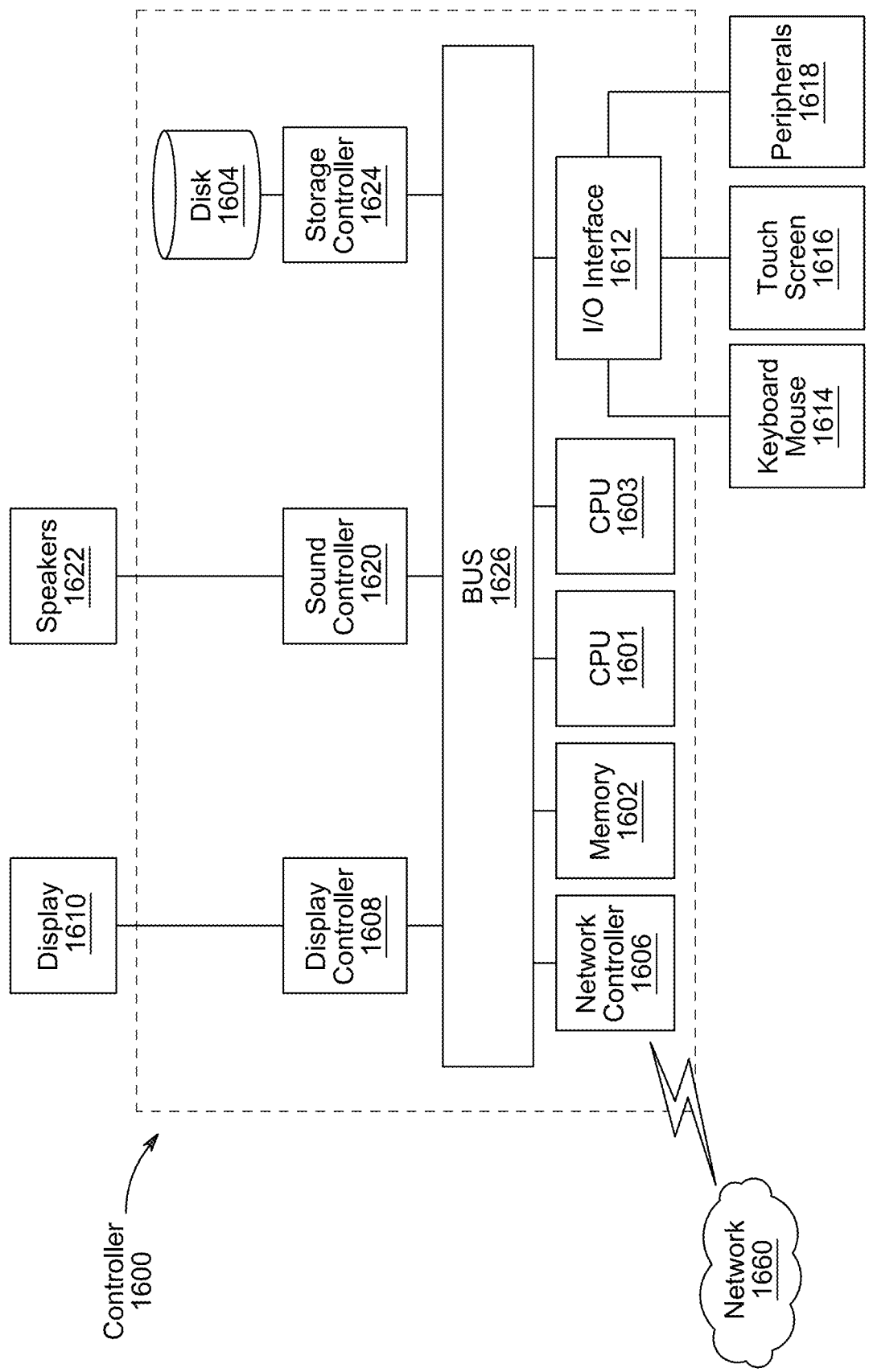
FIG. 16 is an illustration of a non-limiting example of details of computing hardware used in the computing system, according to certain embodiments.

Next, further details of the hardware description of the computing environment according to exemplary embodiments are described with reference to FIG. 16. In FIG. 16, a controller 1600 is described as representative of the system 100 of FIG. 1 in which the controller 1600 is a computing device which includes a CPU 1601 which performs the processes described above/below. The process data and instructions may be stored in a memory 1602 (same as the memory 104). These processes and instructions may also be stored on a storage medium disk 1604, such as a Hard Disk Drive (HDD) or a portable storage medium or may be stored remotely.

Further, the disclosure is not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the disclosure may be provided as a utility application, background daemon, or component of an operating system, or combination thereof, executing in conjunction with the CPU 1601, 1603 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1601 or CPU 1603 may be a Xenon or a Core processor from Intel of America or an Opteron processor from Advanced Micro Devices (AMD) of America, or may be other processor types that would be recognized by one of ordinary skill in the art. Alternatively, the CPU 1601, 1603 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1601, 1603 may be implemented as multiple processors cooperatively working in parallel to perform the instructions of the inventive processes described above.

The computing device in FIG. 16 also includes a network controller 1606, such as an Intel Ethernet Professional (PRO) network interface card from an Intel Corporation of America, for interfacing with a network 1660. As can be appreciated, the network 1660 can be a public network, such as the Internet, or a private network such as a LAN or a WAN, or any combination thereof and can also include a PSTN or an Integrated Services Digital Network (ISDN) sub-networks. The network 1660 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1608, such as a NVIDIA GeForce Giga Texel Shader eXtreme (GTX) or a Quadro graphics adaptor from a NVIDIA Corporation of America for interfacing with a display 1610, such as a Hewlett Packard HPL2445w Liquid Crystal Display (LCD) monitor. A general purpose I/O interface 1612 interfaces with a keyboard and/or mouse 1614 as well as a touch screen panel 1616 on or separate from display 1610. The general purpose I/O interface 1612 also connects to a variety of peripherals 1618 including printers and scanners, such as an OfficeJet or DeskJet from HP.

A sound controller 1620 is also provided in the computing device, such as a Sound Blaster X-Fi Titanium from Creative, to interface with speakers/microphone 1622, thereby providing sounds and/or music.

A general-purpose storage controller 1624 connects the storage medium disk 1604 with a communication bus 1626, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1610, keyboard and/or mouse 1614, as well as the display controller 1608, the general purpose storage controller 1624, the network controller 1606, the sound controller 1620, and the general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 17.

Figure 17:
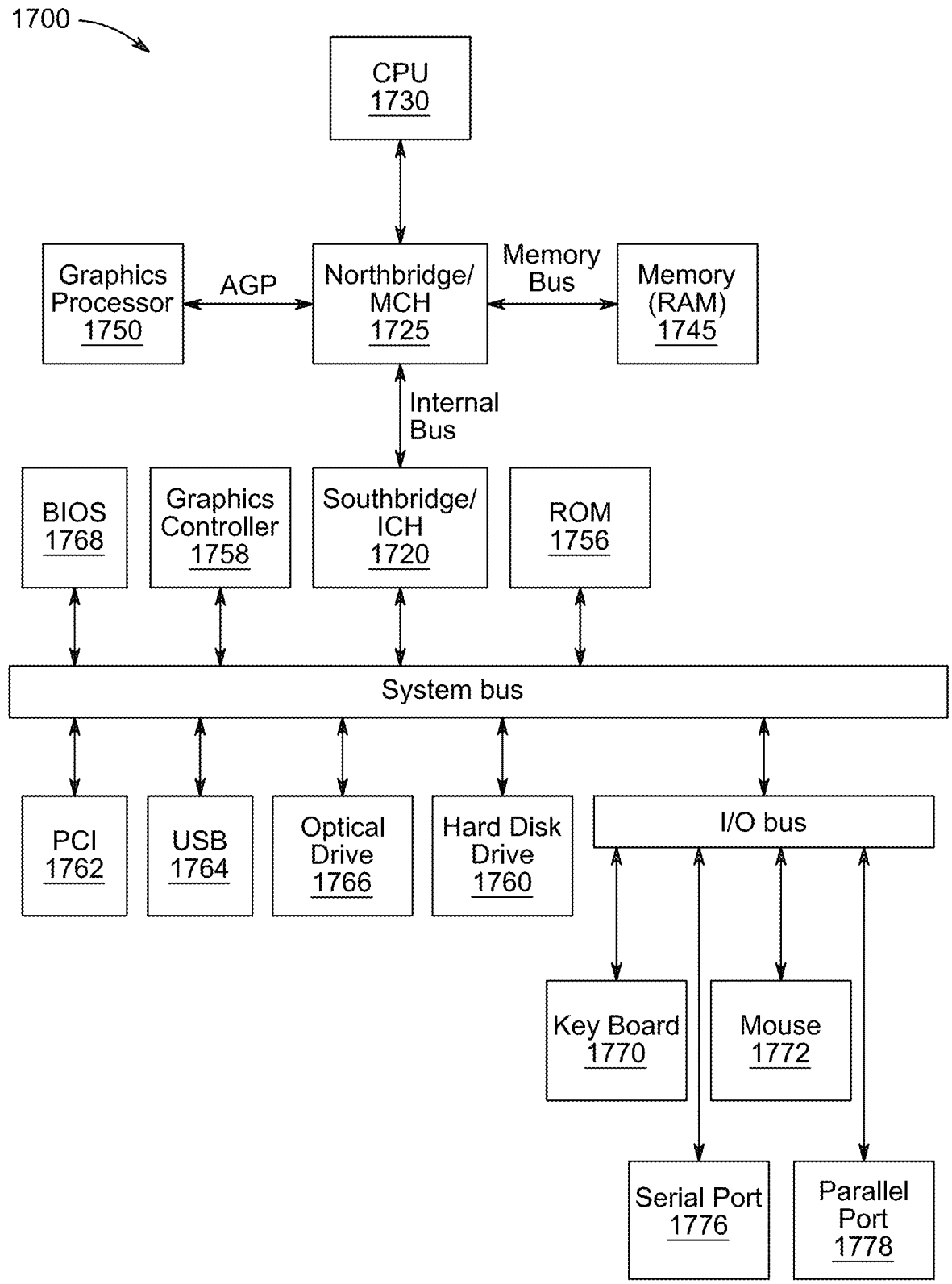
FIG. 17 is an exemplary schematic diagram of a data processing system used within the computing system, according to certain embodiments.

FIG. 17 shows a schematic diagram of a data processing system 1700, according to certain embodiments, for performing the functions of the exemplary embodiments. The data processing system 1700 is an example of a computer in which code or instructions implementing the processes of the illustrative embodiments may be located.

In FIG. 17, the data processing system 1700 employs a hub architecture including a North Bridge and a Memory Controller Hub (NB/MCH) 1725 and a south bridge and an I/O Controller Hub (SB/ICH) 1720. A CPU 1730 is connected to the NB/MCH 1725. The NB/MCH 1725 also connects to a memory 1745 via a memory bus and connects to a graphics processor 1750 via an Accelerated Graphics Port (AGP). The NB/MCH 1725 also connects to the SB/ICH 1720 via an internal bus (e.g., a unified media interface or a direct media interface). The CPU 1730 may contain one or more processors and even may be implemented using one or more heterogeneous processor systems.

Figure 18:
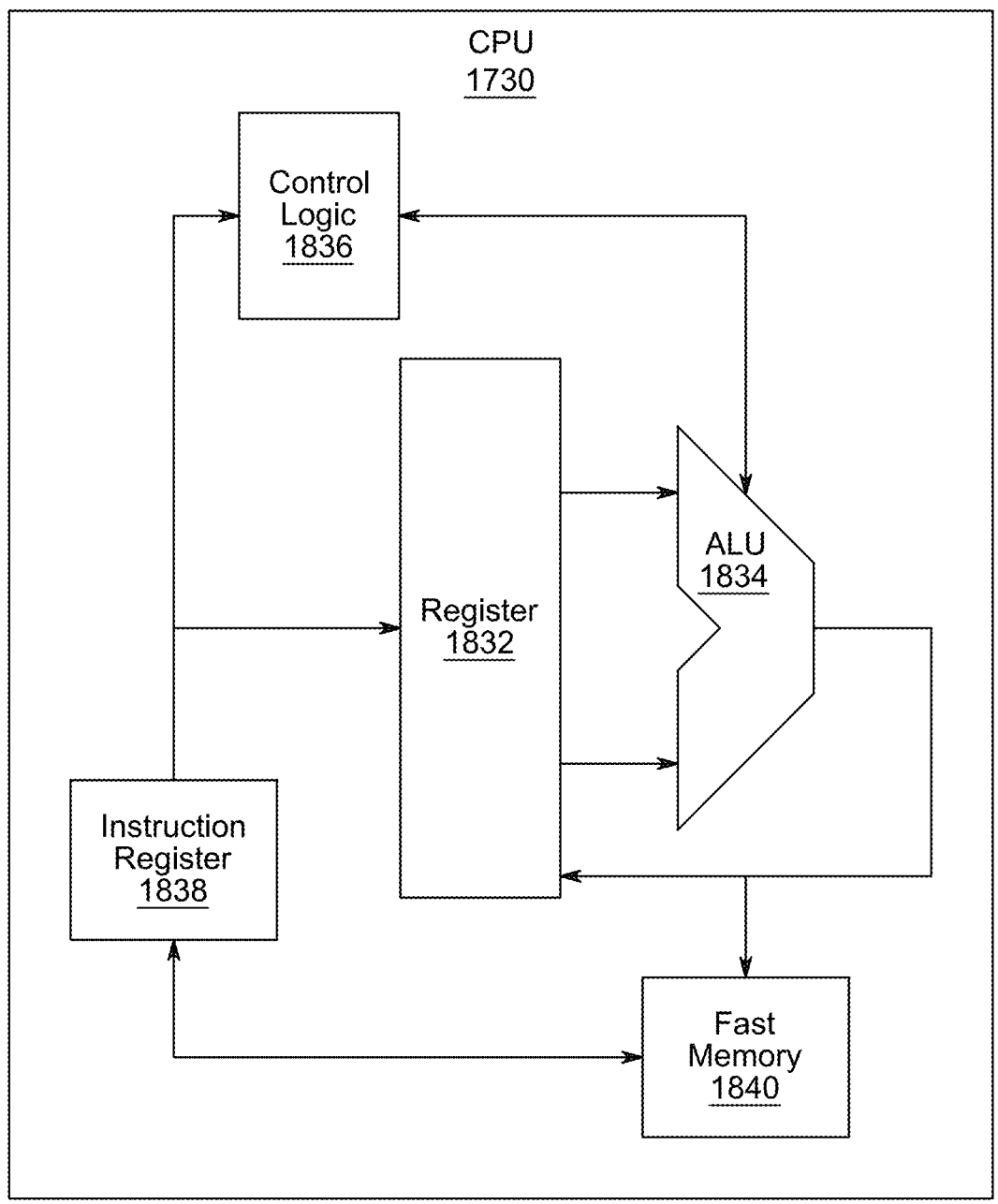
FIG. 18 is an exemplary schematic diagram of a processor used with the computing system, according to certain embodiments.

For example, FIG. 18 shows one implementation of the CPU 1730. In one implementation, an instruction register 1838 retrieves instructions from a fast memory 1840. At least part of these instructions is fetched from the instruction register 1838 by a control logic 1836 and interpreted according to the instruction set architecture of the CPU 1730. Part of the instructions can also be directed to a register 1832. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1834 that loads values from the register 1832 and performs logical and mathematical operations on the loaded values according to the instructions. The results from these operations can be feedback into the register 1832 and/or stored in the fast memory 1840. According to certain implementations, the instruction set architecture of the CPU 1730 can use a reduced instruction set architecture, a complex instruction set architecture, a vector processor architecture, and a very large instruction word architecture. Furthermore, the CPU 1730 can be based on a Von Neuman model or a Harvard model. The CPU 1730 can be a digital signal processor, an FPGA, an ASIC, a Programmable Logic Array (PLA), a PLD, or a Complex Programmable Logic Device (CPLD). Further, the CPU 1730 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 17, the data processing system 1700 can include that the SB/ICH 1720 is coupled through a system bus to an I/O Bus, a ROM 1756, a Universal Serial Bus (USB) port 1764, a flash Binary Input/Output System (BIOS) 1768, and a graphics controller 1758. PCI/PCIe devices can also be coupled to SB/ICH 888 through a PCI bus 1762.

The PCI devices may include, for example, Ethernet adapters, add-in cards, and Personal Computer (PC) cards for notebook computers. The HDD 1760 and an optical drive 1766 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1760 and the optical drive 1766 can also be coupled to the SB/ICH 1720 through a system bus. In one implementation, a keyboard 1770, a mouse 1772, a serial port 1776, and a parallel port 1778 can be connected to the system bus through the I/O bus. Other peripherals and devices that can be connected to the SB/ICH 1720 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 19:
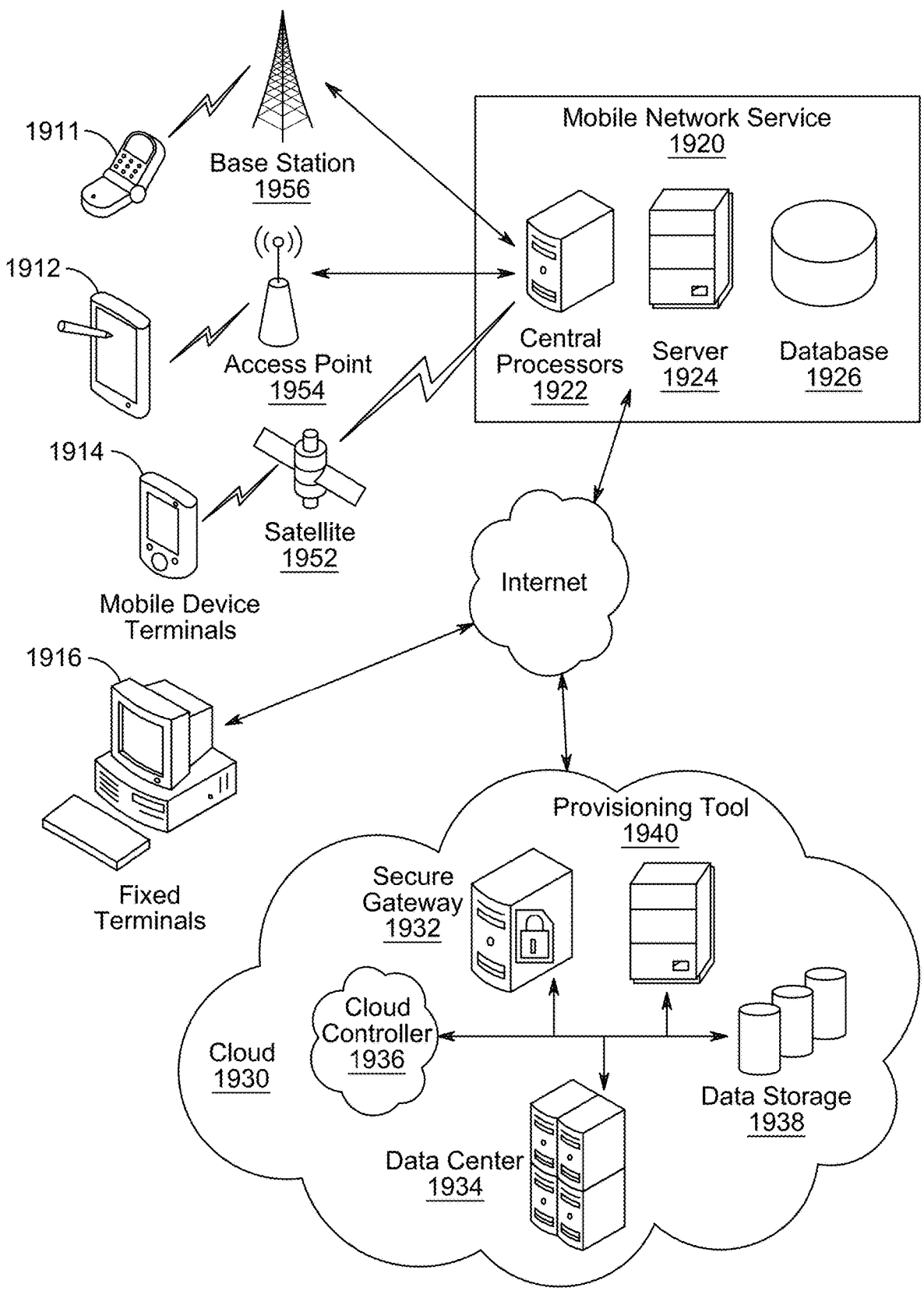
FIG. 19 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 19, in addition to various human interface and communication devices (e.g., display monitors, smart phones, tablets, personal digital assistants (PDAs). More specifically, FIG. 19 illustrates client devices including a smart phone 1911, a tablet 1912, a mobile device terminal 1914 and fixed terminals 1916. These client devices may be commutatively coupled with a mobile network service 1920 via a base station 1956, an access point 1954, a satellite 1952 or via an internet connection. The mobile network service 1920 may comprise central processors 1922, a server 1924 and a database 1926. The fixed terminals 1916 and the mobile network service 1920 may be commutatively coupled via an internet connection to functions in cloud 1930 that may comprise a security gateway 1932, a data center 1934, a cloud controller 1936, a data storage 1938 and a provisioning tool 1940. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is, therefore, to be understood that the invention may be practiced otherwise than as specifically described herein.

The invention claimed is:

1. A portable diagnostic assistance system, comprising:
   a mobile device having a memory storing a plurality of histopathological images of tissue samples obtained using a microscope; and
   a processing circuitry configured with
      a pretrained dense convolutional neural network that receives as input a histopathological image of the plurality of histopathological images and extracts global features of the histopathological image, wherein the global features are spatial features of the histopathological image, and wherein the pretrained dense convolutional neural network includes a plurality of convolutional layers,
      a plurality of trainable residual layers connected to an output of a final layer of the plurality of convolutional layers, each of the plurality of trainable residual layers including a skip connection configured with a 1×1 kernel (K) and a sigmoid activation function to extract local features of the histopathological image, wherein the local features are spectral features,
      a concatenation operator that concatenates the global features with the local features to obtain concatenated features, and
      a classification layer connected to an output of the concatenation operator and configured to output a classification of the histopathological image.

2. The system of claim 1, wherein the 1×1 kernel (K in the skip connection generates learned features obtained from the global features at each pixel location in the histopathological image.

3. The system of claim 2, wherein the sigmoid activation function determines a difference between the learned features and the global features output from the pretrained dense convolutional neural network.

4. The system of claim 1, wherein the pretrained dense convolutional neural network is configured with all of the plurality of convolutional layers directly connected with each other, and wherein each convolutional layer of the pretrained dense convolutional neural network obtains additional inputs from all preceding convolutional layers and passes on its own feature-map to all subsequent convolutional layers.

5. The system of claim 1, wherein the plurality of histopathological images are obtained from breast tissue samples observed with the microscope.

6. The system of claim 5, wherein the classification layer is configured to output a binary classification of benign tissue or malignant tissue.

7. The system of claim 5, wherein the classification layer is configured to output a multiclass classification for histopathological images of malignant tissue including ductal carcinoma (DC), lobular carcinoma (LC), mucinous carcinoma (MC), and papillary carcinoma (PC).

8. The system of claim 1, further comprising a machine learning engine configured to train the pretrained dense convolutional neural network modified with the plurality of trainable residual layers.

9. The system of claim 1, further comprising:
a camera-mounted microscope for capturing images of a tissue specimen to obtain the plurality of histopathological images; and
a communication circuitry configured to transmit the captured images to the mobile device.

10. The system of claim 1, further comprising:
a whole-slide scanner for capturing images of a tissue specimen to obtain the plurality of histopathological images; and
a communication circuitry configured to transmit the captured images to the mobile device.

11. A method of diagnostic assistance, comprising:
retrieving a plurality of histopathological images of tissue samples from a memory;
receiving, by a processing circuitry configured with a pretrained dense convolutional neural network, a histopathological image of the plurality of histopathological images and extracting global features of the histopathological image, wherein the global features are spatial features of the histopathological image, and wherein the pretrained dense convolutional neural network includes a plurality of convolutional layers;
extracting, by the processing circuitry, local features of the histopathological image, by a plurality of trainable residual layers connected to an output of a final layer of the plurality of convolutional layers, each of the plurality of residual layers including a skip connection configured with a 1×1 kernel (K) and a sigmoid activation function, wherein the local features are spectral features;
concatenating, by a concatenation operator, the global features with the local features to obtain concatenated features; and
outputting, by a classification layer, a classification of the histopathological image.

12. The method of claim 11, further comprising generating, by the 1×1 kernel (K in the skip connection, learned features obtained from the global features at each pixel location in the histopathological image.

13. The method of claim 12, further comprising determining, by the sigmoid activation function, a difference between the learned features and the global features output from the pretrained dense convolutional neural network.

14. The method of claim 11, wherein the pretrained dense convolutional neural network is configured with all of the plurality of convolutional layers directly connected with each other, the method further comprising obtaining, by each convolutional layer of the pretrained dense convolutional neural network, additional inputs from all preceding convolutional layers and passing on its own feature-map to all subsequent convolutional layers.

15. The method of claim 11, further comprising obtaining the plurality of histopathological images from breast tissue samples observed with microscope.

16. The method of claim 15, further comprising outputting, by the classification layer, a binary classification of benign tissue or malignant tissue.

17. The method of claim 15, further comprising outputting, by the classification layer, a multiclass classification for histopathological images of malignant tissue including ductal carcinoma (DC), lobular carcinoma (LC), mucinous carcinoma (MC), papillary carcinoma (PC).

18. The method of claim 11, further comprising training, by a machine learning engine, the pretrained dense convolutional neural network modified with the plurality of trainable residual layers.

19. The method of claim 11, further comprising:
capturing with a camera-mounted microscope, images of a tissue specimen to obtain the plurality of histopathological images; and
transmitting, by a communication circuitry, the captured images to a mobile device configured with the processing circuitry.

20. The method of claim 11, further comprising:
capturing with a whole-slide scanner, images of a tissue specimen to obtain the plurality of histopathological images; and
transmitting, by a communication circuitry, the captured images to a mobile device configured with the processing circuitry.

* * * * *